(12) United States Patent
Kobayashi et al.

(10) Patent No.: US 6,817,850 B2
(45) Date of Patent: Nov. 16, 2004

(54) METHOD OF AND APPARATUS FOR FORMING FOOD

(75) Inventors: Masao Kobayashi, Fukui (JP); Hironori Kobayashi, Fukui (JP); Toru Fukiage, Fukui (JP)

(73) Assignee: Kobird Co., Ltd., Fukui (JP)

( * ) Notice: Subject to any disclaimer, the term of this patent is extended or adjusted under 35 U.S.C. 154(b) by 124 days.

(21) Appl. No.: 10/203,955

(22) PCT Filed: Apr. 8, 2002

(86) PCT No.: PCT/JP02/03474

§ 371 (c)(1),
(2), (4) Date: Aug. 14, 2002

(87) PCT Pub. No.: WO02/082910

PCT Pub. Date: Oct. 24, 2002

(65) Prior Publication Data

US 2003/0190391 A1 Oct. 9, 2003

(30) Foreign Application Priority Data

| Apr. 9, 2001 | (JP) | 2001-110297 |
| May 14, 2001 | (JP) | 2001-143043 |
| Aug. 10, 2001 | (JP) | 2001-244194 |
| Sep. 11, 2001 | (JP) | 2001-274801 |
| Dec. 18, 2001 | (JP) | 2001-384276 |

(51) Int. Cl.$^7$ ............................................. A21C 9/00
(52) U.S. Cl. .................... 425/112; 99/450.6; 99/450.7; 425/135; 425/324.1; 425/518; 426/283; 426/297; 426/512
(58) Field of Search ................................. 425/112, 135, 425/324.1, 518; 99/450.6, 450.7; 426/283, 297, 512

(56) References Cited

U.S. PATENT DOCUMENTS

| 3,572,259 A | * | 3/1971 | Hayashi ..................... 426/283 |
| 4,147,014 A | * | 4/1979 | Tashiro et al. ............... 425/112 |
| 4,515,819 A | * | 5/1985 | Shinriki ...................... 426/297 |
| 4,579,745 A | | 4/1986 | Mei Sue ...................... 426/512 |
| 4,966,542 A | * | 10/1990 | Kobayashi ................... 425/307 |
| 5,004,619 A | * | 4/1991 | Kobayashi ................... 426/297 |
| 5,558,896 A | * | 9/1996 | Kobayashi ................... 426/516 |
| 5,941,055 A | * | 8/1999 | Coates ........................ 425/112 |
| 6,248,385 B1 | * | 6/2001 | Tashiro ....................... 426/283 |

FOREIGN PATENT DOCUMENTS

| JP | 59-50278 U | 4/1984 |
| JP | 60-105481 A | 6/1985 |
| JP | 62-65095 U | 4/1987 |
| JP | 62-148075 U | 9/1987 |
| JP | 62-198373 A | 9/1987 |
| JP | 63-29433 Y2 | 8/1988 |
| JP | 63-173082 U | 11/1988 |
| JP | 02-227062 A | 9/1990 |
| JP | 07-18299 Y2 | 5/1995 |
| JP | 09-238661 A | 9/1997 |
| JP | 09-289866 A | 11/1997 |
| JP | 2000-050854 A | 2/2000 |

* cited by examiner

Primary Examiner—Robert B. Davis
(74) Attorney, Agent, or Firm—Fynn, Thiel, Boutell & Tanis, P.C.

(57) ABSTRACT

There is provided a method of and apparatus for forming a food by wrapping an inner material with an outer skin material, and the method of and apparatus for sealing the outer skin material more surely in a state where the inner material is disposed on the outer skin material. The food forming apparatus comprises a first shutter (1), a second shutter (2) disposed under the first shutter (1), and support means (6) disposed under the second shutter (2) wherein an operation start timing of the second shutter (2) subsequent to starting of the operation of the first shutter (1) is adjusted appropriately, and a position of the support member (60) is adjusted appropriately, thereby adjusting the amount of collection of the peripheral portion of the curst material (F), thereby wrapping an inner material (G) with the outer skin material (F) in response to the different sizes of the curst material (F) and the inner material (G), thereby surely forming the food.

13 Claims, 27 Drawing Sheets

METHOD OF AND APPARATUS FOR FORMING FOOD

FIELD OF THE INVENTION

The invention relates to a method of and apparatus for forming a food, particularly to a method of and apparatus for forming a food by surely wrapping an inner material such as bean jam, cooked meat and vegetables and the like with an outer skin material such as bread dough, bun dough and the like without damaging the dough.

BACKGROUND OF THE INVENTION

As a technique for the formation of a food by wrapping an inner material with an outer skin material, it has been carried out conventionally that the cylindrical outer skin materials provided outside the inner materials formed in a rod shape are continuously formed in a food, which are narrowed by an open/close operation of a shutter mechanism, then the food is cut (e. g. Japanese Utility Model Publication No. 63/29433). However, when dough such as bread dough and the like having fermentation property is used as an outer skin material and formed in a cylindrical shape, a pressure or twist is applied to the outer skin material so as to damage the dough. After the dough is cut and formed in a food, the dough is not sufficiently swelled up, thereby rendering the food hard and non-elastic in the outer skin material, and hence the forming process is manually carried out at present. There is proposed a method of forming a food using a sheet-shaped outer skin material to avoid the cylindrical formation of the outer skin material. For example, Japanese Utility Model Publication No. 7-18299 discloses that bread dough and bean jam are filled in a cup and the bread dough is sealed by a sealing gate. Further, Japanese Patent Laid-Open Publication No. 2000-50854 discloses that an outer skin material is formed in a bowl shape along an inner wall surface of a cup-shaped female mold which is opened at the upper surface, and an inner material is supplied to the inside of the outer skin material which was formed in a bowl shape, then an upper peripheral portion of the outer skin material is narrowed by a shutter comprised of plural shutter members, thereby sealing the upper peripheral portion of the outer skin material with which the inner material is wrapped. When the outer skin material is narrowed and sealed by the shutter members, a plug is disposed in an opening of the female mold, thereby preventing the narrowed outer skin material from protruding toward the upper portion of the shutter members.

In the case of forming a food using a sheet-shaped outer skin material as set forth above, it is necessary to consider that the sizes of the outer skin materials are differentiated depending on the sizes of foods to be formed or the shapes of the outer skin materials are varied even if they have the same size. This is caused by the fact that although the outer skin material is frequently rolled by a pair of rotary rollers so as to form the outer skin material in a sheet-shape, it is difficult to render the shapes of the outer skin materials constant because dough has flexibility. However, the conventional food forming method using the above mentioned sheet-shaped outer skin material cannot sufficiently cope with the change of the shapes of the outer skin materials. For example, according to Japanese Utility Model Publication No. 7-18299, since the cup is used, an opening area of the cup is determined beforehand, and hence when both the outer skin material and inner material become large in the case of forming a large food, there is a likelihood that the outer skin material extrudes from the upper surface of the sealing gate when the outer skin material is sealed by the sealing gate. Although there was described the provision of a dough support height adjusting mechanism to cope with a large or small capacity of a product, which is however limited to the adjustment inside the cup, and hence the sufficient adjustment is not always assured. It is considered that a large cup is replaced by the cup depending on the size of a food, but it is not practical to change the cup every time when manufacturing various kinds of foods in a mass production process. Further, in the case of sealing the dough piece by the sealing gate which is placed on the peripheral portion of the cup, if the shapes of the dough pieces are varied, it is not avoidable that the surplus dough piece is extruded from the upper portion of the sealing gate and separated from the dough piece and remains as refuse. This is caused by the fact that since the size of the opening of the cup is determined, if the shapes of the dough pieces are varied, the width of the peripheral portion of the dough piece which is held by the opened edge of the cup is not uniform, so that the peripheral portion of the dough piece having the large width extrudes from the upper portion of the sealing gate when it is sealed by the sealing gate. The extruded dough piece is separated by the sealing gate and it remains on the upper surface of the sealing gate or dropped from the sealing gate and left inside the apparatus as refuse. If the remaining refuse of the dough piece is not removed, it enters a food to render the food defective, or it enters the apparatus to cause a trouble. It is conceived to uniform the shapes of the dough piece in advance to cope with such problems, which however results in addition of a process line, which causes the problem of taking much manufacturing time and increasing damage to be applied to the dough. Japanese Patent Laid-Open Publication No. 2000-50854 also uses a cup-shaped female mold, which has however a limit to cope with the sizes of the outer skin material and inner material because the food is formed using the cup as set forth above. Although the outer skin material is prevented from being protruded by the plug so as avoid the extrusion of the dough, a gap has to be provided between the shutter and the plug for operating the shutter because the plug is set in position by the vertical movement thereof. Accordingly, it is not avoidable that the dough clamped between the shutter members is pushed toward the gap between the shutter and the plug and extruded when the shutter is closed. As mentioned above, if the food is formed using the cup and the like, the formation is limited by the cup and the like, and hence such a method cannot flexibly cope with the dough pieces which are not constant in sizes, shapes and properties.

SUMMARY OF THE INVENTION

The invention has been developed in view of the problems of the conventional food forming apparatus, and it is an object of the invention to provide a food forming method and a food forming apparatus capable of simply coping with the sizes, shapes, and properties of outer skin materials and inner materials to be formed in foods, and capable of surely wrapping the inner material with the outer skin material while reducing damage to be applied to the outer skin material.

The food forming method of the invention comprises a disposition step for disposing an inner material on an outer skin material, a shutter step for operating a first shutter and a second shutter provided under the first shutter so as to wrap the inner material with the outer skin material. The food forming apparatus of the invention comprises a first shutter comprised of a plurality of shutter members, a second shutter disposed under the first shutter and comprised of a plurality of shutter members, and shutter control means for operating the first and second shutters respectively so as to wrap an inner material with an outer skin material.

Since the invention has a structure set forth above, a food is formed wherein the inner material can be surely wrapped with the outer skin material, thereby preventing the occurrence of refuse caused by the separation of the outer skin material. That is, when the opening areas of the first and second shutters are set appropriately corresponding to the sizes, shapes and properties of the outer skin materials and the inner materials and the first and second shutters are operated, the inner material can be surely wrapped with the outer skin material. Further, since the first shutter and the second shutter are operated respectively, both the first and second shutters are coordinated with each other in response to the sizes, shapes and properties of the outer skin materials and the inner materials and cope with them so that the peripheral portion of the outer skin material can be surely collected and sealed. Accordingly, it is possible to prevent the occurrence of refuse caused by the separation of the outer skin material.

In the shutter step, it is preferable that the operation of the second shutter is started after the operation of the first shutter was started. Further, it is preferable that the shutter control means comprises first shutter control means for operating the first shutter in a state where the inner material is disposed on the outer skin material, and second shutter control means for controlling operation start timing of the second shutter and also operating the second shutter so as to seal a peripheral portion of the outer skin material after an operation of the first shutter is started. In such a manner, if the first shutter is operated earlier than the second shutter disposed under the first shutter, a series of operations extending from the collecting operation to the sealing operation of the outer skin material can be effected smoothly.

Further, during the shutter step, it is allowed that the first shutter collects a peripheral portion of the outer skin material when it effects a close operation so as to wrap the inner material with the outer skin material, and the second shutter seals the collected peripheral portion of the outer skin material when it effects a close operation. By doing so, the sealing operation is effected by the second shutter after the peripheral portion of the outer skin material was collected by the first shutter, so that the inner material can be surely wrapped with the outer skin material. And the first shutter is rendered in a close state when the second shutter effects the sealing operation, thereby preventing the outer skin material from extruding.

During the shutter step, it is allowed that the first shutter operates to collects the peripheral portion of the outer skin material at an area surrounded by a plurality of shutter members of the first shutter, and the second shutter operates to seal the collected peripheral portion of the outer skin material. By doing so, the sealing operation is effected by the second shutter after the peripheral portion of the outer skin material was collected by the first shutter, so that the inner material can be surely wrapped with the outer skin material, and also the outer skin material is separated and no refuse is occurred because the first shutter and the second shutter are not rendered in a completely close state.

During the disposition step, it is preferable that the outer skin material is formed in a bowl shape. By doing so, the operation extending from the collecting operation of the peripheral portion of the outer skin material to the sealing operation during the shutter step can be smoothly effected.

It is allowed that the formation of the outer skin material in a bowl shape is made by supplying the outer skin material onto the shutter members of the second shutter to recess a central portion of the outer skin material in a state where the first shutter is opened or supplying the outer skin material onto the shutter members of the first shutter to recess a central portion of the outer skin material.

When the outer skin material is supplied onto the shutter members of the second shutter and the central portion of the outer skin material is recessed so as to be formed in a bowl shape in a state where the first shutter is opened, it is preferable that the peripheral portion of the outer skin material is held on the shutters of the second shutter. By doing so, the outer skin material can be surely formed in a bowl shape. Further, it is allowed that the outer skin material is supplied to a receiving member disposed over the shutter members of the second shutter so that the peripheral portion of the outer skin material is held on the receiving member. When the peripheral portion of the outer skin material is held, it is allowed to be partially held. Further, it is allowed that holding means is provided with protuberances for partially holding the peripheral portion of the outer skin material. By doing so, the thickness of the outer skin material which was sealed by the shutters can be thinned.

In the case of forming the outer skin material in a bowl shape, it is allowed that the shutter members of the second shutter is opened and outer skin material forming means is advanced into an opening of the second shutter to recess the central portion of the outer skin material or the central portion of the outer skin material is drawn by the crust forming means through the opening of the second shutter to recess the central portion of the outer skin material. It is allowed that the curst material forming means is provided with pushing means for pushing the outer skin material into an opening area of the second shutter or provided with suction means for drawing the outer skin material through the opening area of the second shutter. It is allowed that the pushing means is provided with inner material supply means for supplying the inner material. By doing so, the forming process can be effected efficiently.

In such a manner, if the outer skin material is formed in a bowl shape using the shutter members, the shutter step can be effected immediately after the outer skin material was formed in the bowl shape, and it is not necessary to provide a space separately for forming the outer skin material in the bowl shape.

Still further, it is preferable that the first shutter is operated before the outer skin material is formed in a bowl shape to adjust a position of the outer skin material. By doing so, the positional displacement of the outer skin material after the supply of the outer skin material is adjusted in advance, so that the forming process can be more surely effected.

More still further, it is preferable to provide support means disposed under the second shutter for supporting the outer skin material and the support means supports the outer skin material at least during the shutter step. By doing so, the outer skin material can be kept in a stable state during the shutter step. Yet, it is allowed that the support means comprises a support member disposed under the second shutter for supporting the outer skin material and support interval adjusting means for adjusting an interval between the second shutter and the support member. If the interval between the second shutter and the support member is adjusted appropriately to form the food, it can cope with the sizes and the properties of the outer skin materials and inner materials to meet the situation.

Still further, it is preferable to provide plural pairs of the first shutter and the second shutter which are paired with each other. By doing so, the forming process can be effected at the same time, thereby enhancing the productivity.

BEST MODE FOR CARRYING OUT THE INVENTION

Figure 1:
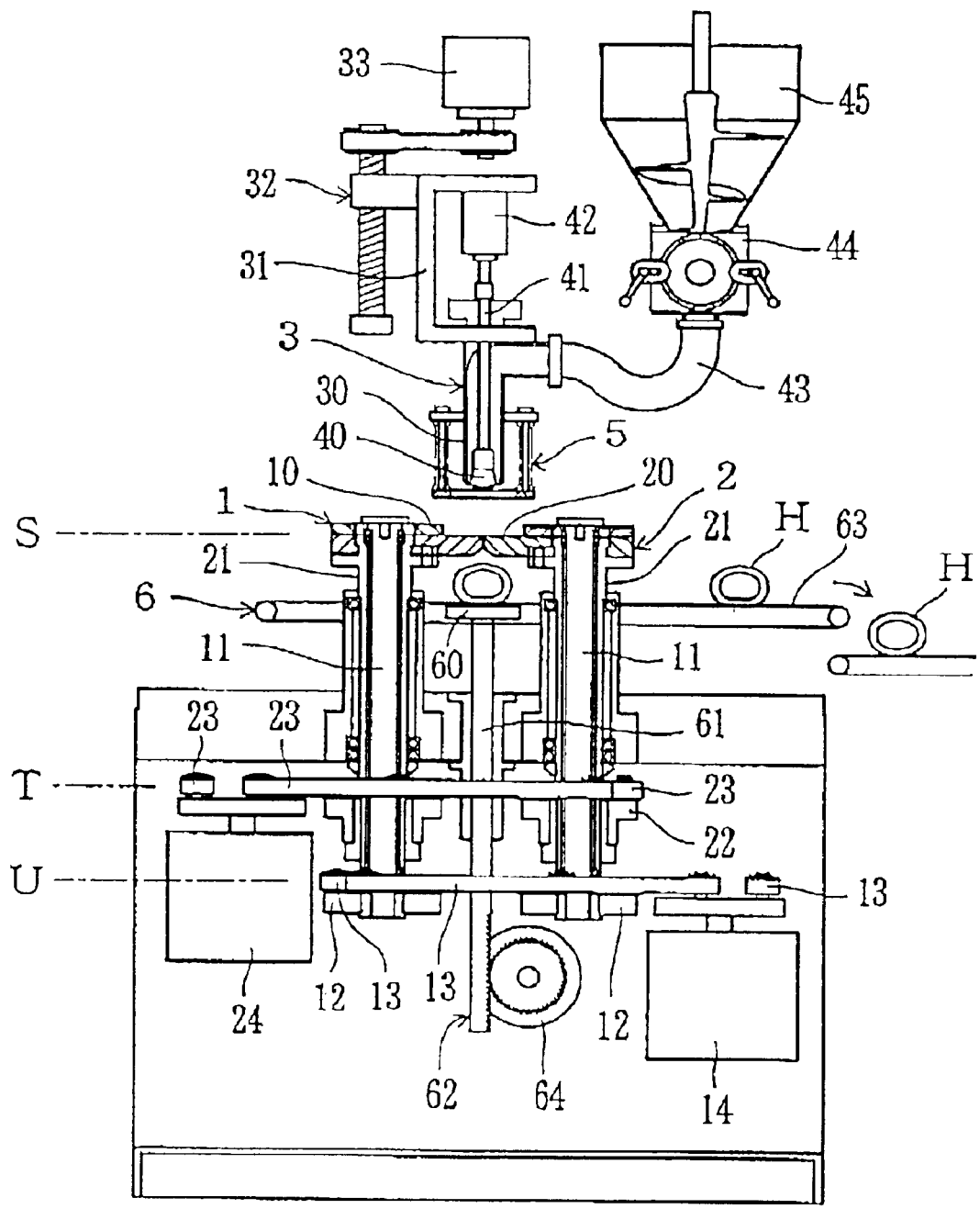
FIG. 1 is a partial sectional front view of a food forming apparatus embodied in the present invention.
Figure 2:
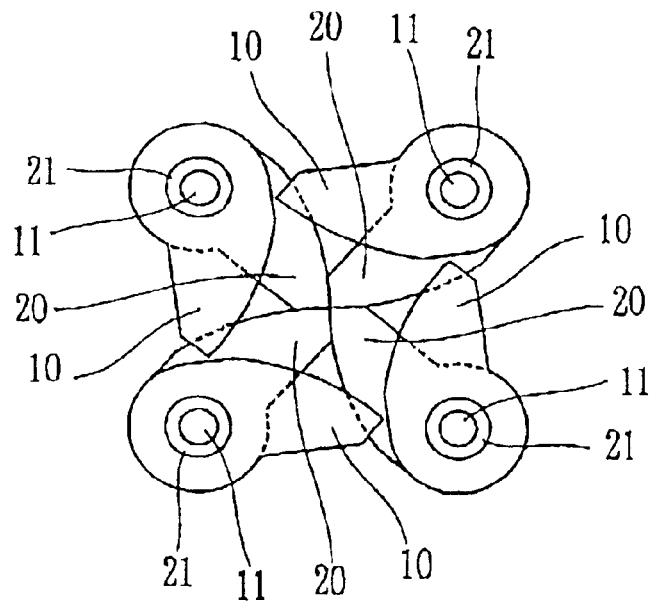
FIG. 2 is a schematic plan view of a first shutter and a second shutter of the food forming apparatus embodied in the present invention.

In FIG. 1, depicted by 1 is a first shutter 1 comprised of four pieces of shutter members 10, 10 . . . which are closable and combined with one another as shown in the plan view of FIG. 2. FIG. 2 is the plan view taken along a surface S in FIG. 1. As shown in FIG. 1 and FIG. 2, the first shutter 1 is structured such that the shutter members 10, 10 . . . fixed to drive shafts 11, 11 . . . are respectively reciprocally swung about the drive shafts 11, 11 . . . and respective tips of the shutter members 10, 10 . . . are slidably moved along the adjacent respective sides of the shutter members 10, 10 . . . so as to open and close an opening area which is formed by surrounding the respective sides of the shutter members 10, 10 . . . In FIG. 1, depicted by 2 is a second shutter comprised of four pieces of shutter members 20, 20 . . . which are structured to be opened and closed combined with one another as shown by the plan view in FIG. 2 and is disposed under the first shutter 1. The respective shutter members 20, 20 . . . of the second shutter 2 are disposed such that the upper surfaces thereof have no space relative to the lower surfaces of the shutter members 10, 10 . . . of the first shutter 1. The shutter members 20, 20 . . . are fixed to hollow drive shafts 21, 21 . . . provided concentrically with the drive shafts 11, 11 . . . of the first shutter 1 and they are reciprocally swung about the hollow drive shafts 21, 21 . . . and respective tips of the shutter members 20, 20 . . . are slidably moved along the adjacent respective sides of the shutter members 20, 20 . . . so as to open and close an opening area which is defined by being surrounded by the respective sides of the shutter members 20, 20 . . . .

Figure 3:
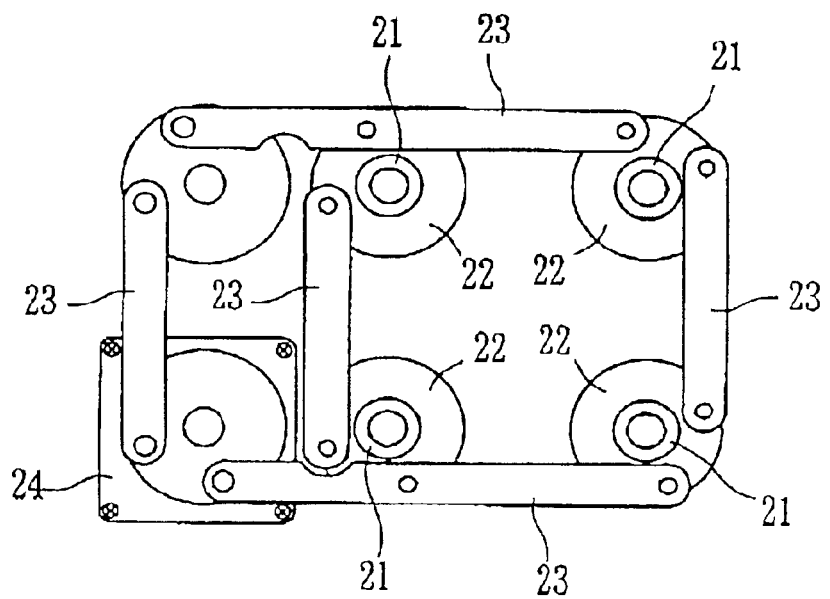
FIG. 3 is a schematic plan view showing a driving mechanism of the second shutter of the food forming apparatus embodied in the present invention.
Figure 4:
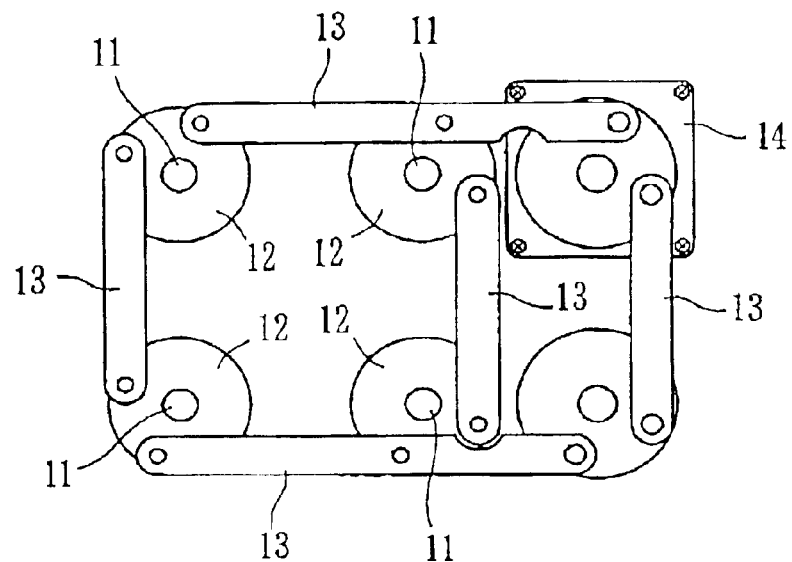
FIG. 4 is a schematic plan view showing a driving mechanism of the first shutter of the food forming apparatus embodied in the present invention.

FIG. 4 is a plan view as viewed from a surface U in FIG. 1, and shows a drive mechanism of the first shutter 1. The drive mechanism of the first shutter 1 comprises, as shown in FIG. 1 and FIG. 4, flanges 12 fixed to the lower ends of the drive shafts 11, 11, links 13, 13 . . . pivotally fixed to the flanges 12 for interconnecting between the flanges 12, and a motor 14 for driving the links 13, 13 . . . , wherein when the rotary direction, a rotary angle and the like of the motor 14 are controlled by first shutter control means, described later, so that the links 13, 13 . . . are interlocked with one another to open and close the first shutter 1 appropriately. FIG. 3 is a plan view taken along a surface T in FIG. 1 and shows a shutter drive mechanism of the second shutter 2. The drive mechanism of the second shutter 2 comprises, as shown in FIG. 1 and FIG. 3, flanges 22 fixed to the lower ends of the hollow drive shafts 21, 21 . . . , and links 23, 23 . . . pivotally fixed to the flanges 22 for interconnecting between the flanges 22, and a motor 24 for driving the links 23, 23 . . . , wherein when a rotary direction, the rotary angle and the like of the motor 24 are controlled by second shutter control means, described later, so that the links 23, 23 . . . are interlocked with one another to open and close the second shutter 2 appropriately.

In FIG. 1, depicted by 3 is pushing means for forming an outer skin material into a bowl shape. The pushing means 3 according to the embodiment of the invention comprises, as shown in FIG. 1, a pushing member 30 fixed to a stay 31, a feed screw mechanism 32 for vertically moving the stay 31 and a motor 33 for driving the feed screw mechanism 32. When a rotary direction, a rotary angle and the like of the motor 33 are controlled, the pushing member 30 is moved up and down appropriately. Described in detail again, when the pushing member 30 is lowered to advance into an opening area of the second shutter 2, each central portion of the sheet-shaped outer skin material which is supplied to the shutter members 20, 20 . . . of the second shutter 2 is recessed so as to be formed in a bowl shape.

Further, according to this embodiment, there is provided inner material supply means for supplying an inner material to the bottom of the outer skin material which was formed in a bowl shape in addition to the formation of the outer skin material in a bowl shape. That is, the pushing member 30 comprises a cylindrical body having a discharge port at the lower end thereof through which the inner material is discharged, and a valve 40 provided therein for opening and closing the discharge port. The inner material introduced into a hopper 45 is supplied under pressure into the cylindrical body of the pushing member 30 through a supply pipe 43 by a conventional known pump 44, and the valve 40 is moved up and down via a rod 41 by driving an air cylinder 42 fixed to the stay 31, thereby opening and closing the discharge port appropriately through which a required amount of inner material is supplied to the bottom of the outer skin material formed in the bowl shape.

In FIG. 1, depicted by 5 is holding means for holding the peripheral portion of the outer skin material onto the shutter members 20, 20 . . . of the second shutter 2. The holding means 5 comprises, as shown in FIG. 6(b), a ring-shaped stay 52 having a plurality of through holes is fixed to the pushing member 30, wherein a plurality of support rods 51, 51 . . . are fitted into the through holes of the stay 52 to be vertically slidably inserted thereinto, and they have heads which are engageable with the stay 52 at the upper end thereof. A ring-shaped press member 50 which surrounds the pushing member 30 is fixed to the lower ends of the support rods 51, 51 . . . and coil springs 53 are positioned between the press member 50 and the stay 52, and fitted around the support rods 51, 51 . . . for urging the press member 50 downward. Described in detail again, when the pushing member 30 is lowered for forming the outer skin material, the press member 50 presses and holds the peripheral portion of the outer skin material over the shutter members 20, 20 . . . of the second shutter 2.

In FIG. 1, depicted by 6 is support means which is disposed under the second shutter 2 for holding the outer skin material. The support means 6 comprises, as shown in FIG. 1, a support member 60 and a belt conveyor 63 wherein a belt is moved up and down by the support member 60. The support member 60 is connected to a rack and pinion mechanism 62 via a support rod 61 wherein when the rack and pinion mechanism 62 is driven by a motor 64, the support member 60 is moved up and down appropriately via the support rod 61 so that an interval between the support member 60 and the second shutter 2 is adjusted. According to this embodiment, support interval adjusting means includes the support rod 61,the rack and pinion mechanism 62, the motor 64 and motor control means of the motor 64, described later.

Figure 5:
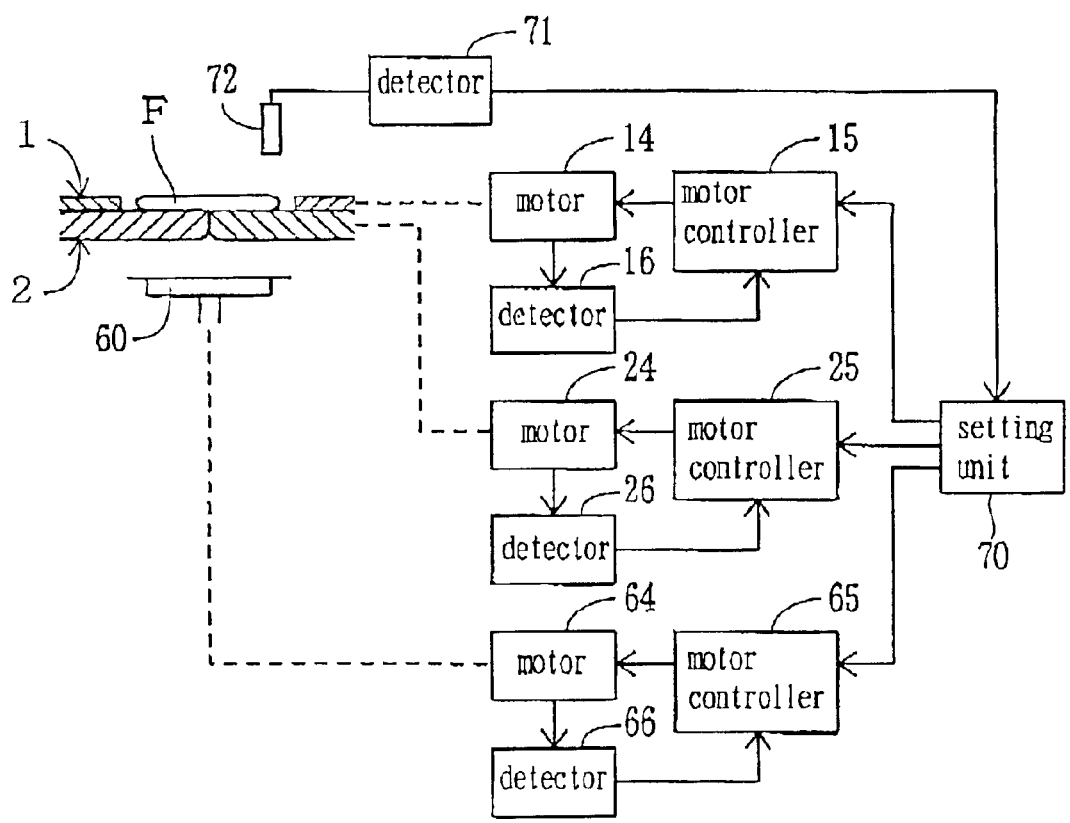
FIG. 5 is a schematic block diagram explaining respective control means of the food forming apparatus embodied in the present invention.

FIG. 5 shows first shutter control means, second shutter control means and the motor control means of the motor 64. The first shutter control means comprises a motor controller 15 for controlling the driving of the motor 14, a detector 16 for detecting the rotary direction and the rotary angle of the motor 14 and a setting unit 70 for setting driving data such as a start timing, the rotary direction and the rotary angle of the motor 14. An optical sensor 72 is disposed over the first shutter 1 for detecting the presence of the outer skin material, and an output signal from the optical sensor 72 is processed by a detector 71 and is inputted to the setting unit 70. The setting unit 70 inputs a set signal to the motor controller 15 based on the detected signal from the detector 71 and set driving data. The motor controller 15 starts the rotation of the motor 14 at the start timing which is set in response to the set signal and controls the rotation of the motor 14 in response to the set signal from the setting unit 70 based on the detected signal from the detector 16.

The second shutter control means comprises a motor controller 25 for controlling the driving of the motor 24, a detector 26 for detecting the rotary direction and the rotary angle of the motor 24 and a setting unit 70 for setting driving data such as a start timing, the rotary direction and rotary angle and the like of the motor 24. If the set signal from the setting unit 70 is inputted to the motor controller 25 in the same manner as the first shutter control means, the motor controller 25 starts the rotation of the motor 24 at the set start timing, and controls the rotation of the motor 24 based on the detected signal from the detector 26.

The motor control means of the motor 64 comprises a motor controller 65 for controlling the driving of the motor 64, a detector 66 for detecting the rotary direction and the rotary angle of the motor 64 and the setting unit 70 for setting driving data such as start timing, the rotary direction and the rotary angle and the like of the motor 64. When the set signal from the setting unit 70 is inputted to the motor controller 65 in the same manner as the first shutter control means, the motor control unit 65 starts the rotation of the motor 64 at the set start timing and controls the rotation of the motor 64 based on the detected signal from the detector 66.

Described hereinafter with reference to FIG. 6 to FIG. 14 is the food forming process by use of the food forming apparatus according to this embodiment of the invention. FIG. 6(a) to FIG. 14(a) show plan views of the first and second shutters respectively in each process shown in FIG. 6(b) to FIG. 14(b). This embodiment is exemplified for the case where dough is used as an outer skin material F, and bean jam is used as an inner material G.

Figure 6A:
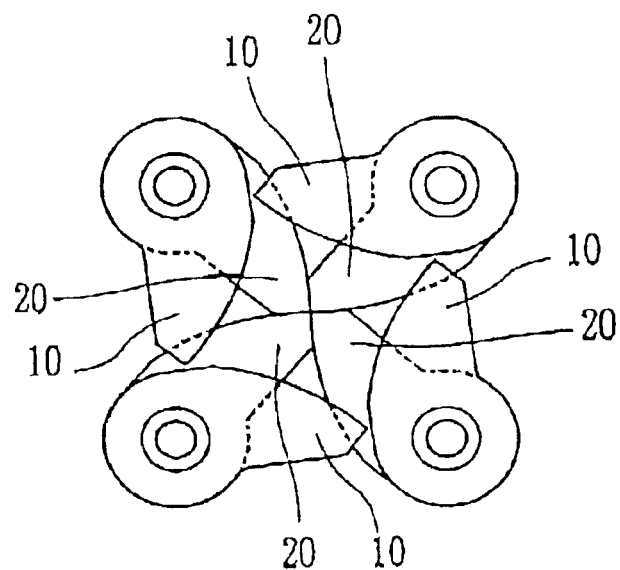
FIG. 6(a) and FIG. 6(b) are a plan view and a schematic side view, respectively, of shutters explaining food forming process by use of the food forming apparatus embodied in the present invention.
Figure 6B:
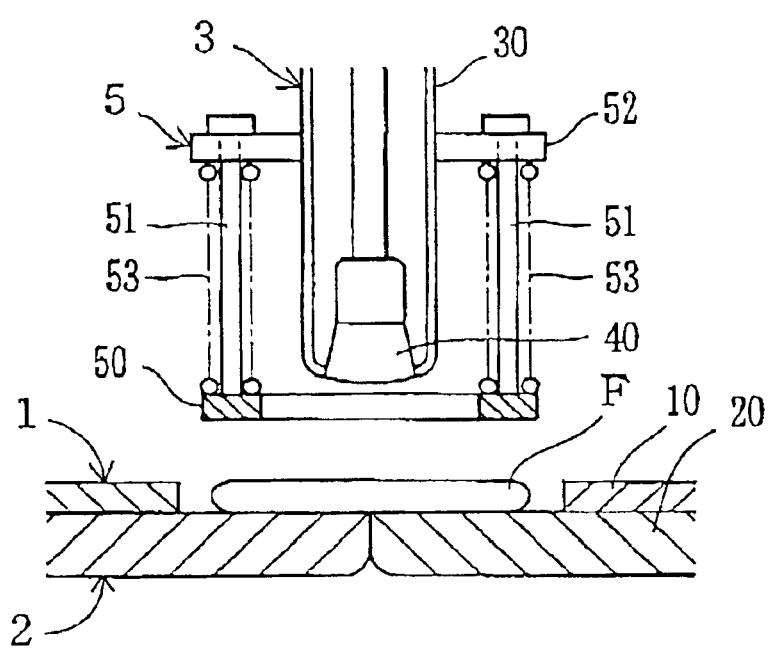
Figure 7:
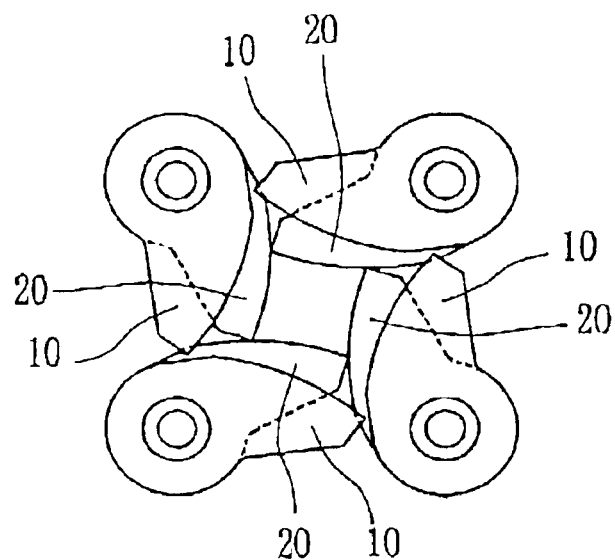
FIG. 7(a) and FIG. 7(b) are a plan view and a schematic side view, respectively, of shutters explaining food forming process by use of the food forming apparatus embodied in the present invention.
Figure 7:
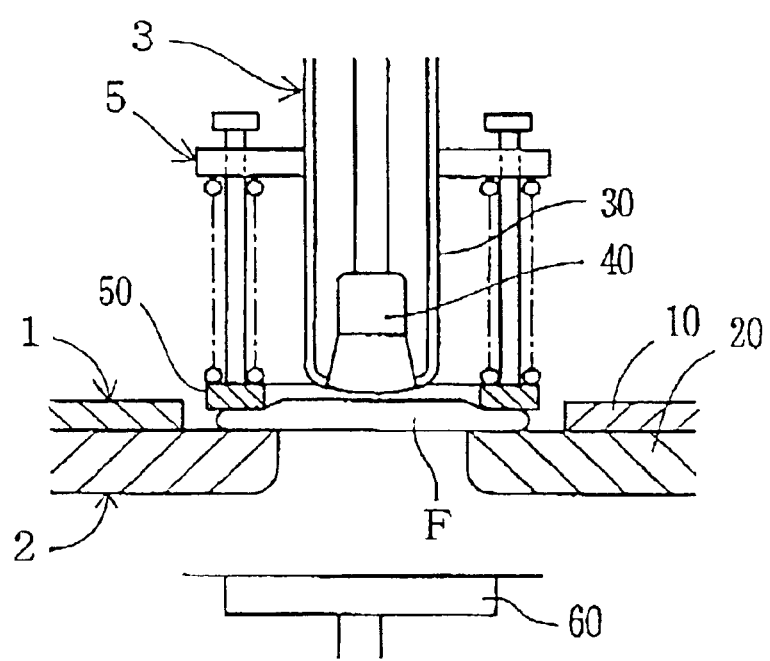
Figure 8:
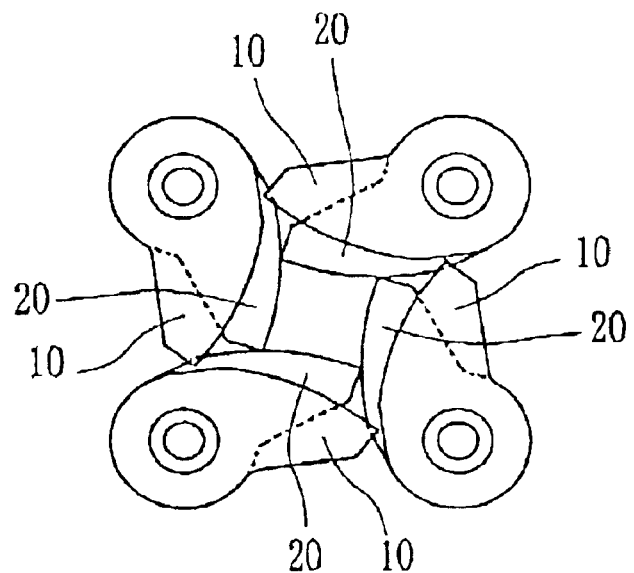
FIG. 8(a) and FIG. 8(b) are a plan view and a schematic side view, respectively, of shutters explaining food forming process by use of the food forming apparatus embodied in the present invention.
Figure 8:
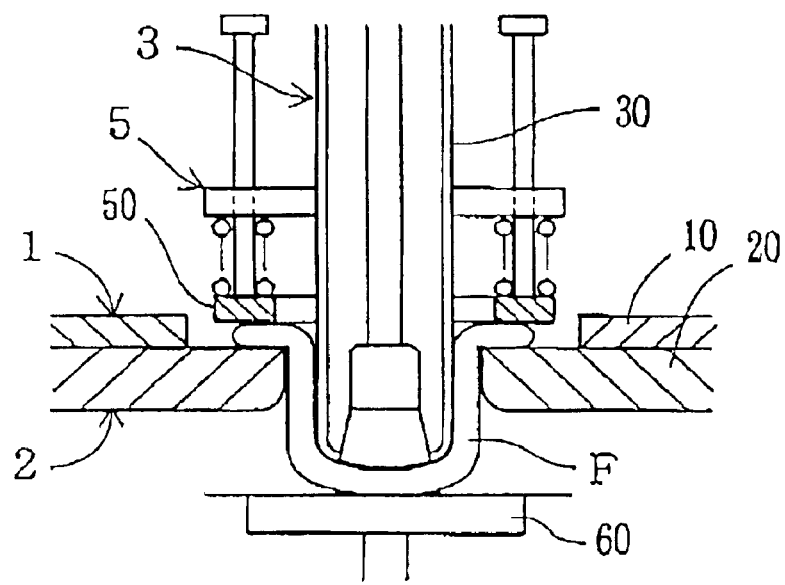
Figure 9:
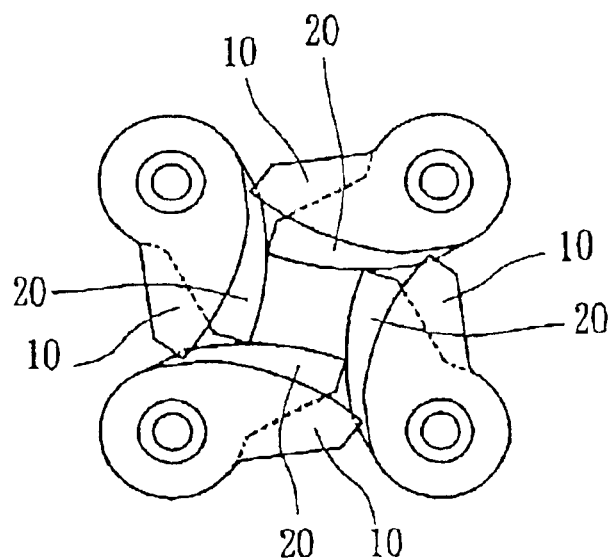
FIG. 9(a) and FIG. 9(b) are a plan view and a schematic side view, respectively, of shutters explaining food forming process by use of the food forming apparatus embodied in the present invention.
Figure 9:
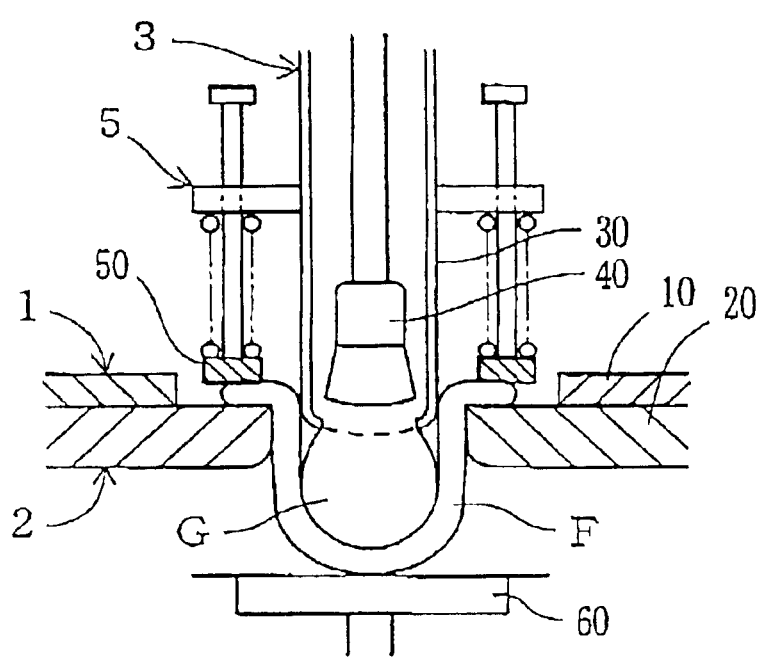

First, driving data relating to operations of the first shutter 1, the second shutter 2 and the support member 60 are inputted to the setting unit 70 shown in FIG. 5 so as to render the first and second shutters 1 and 2 in an initial set state, wherein the first shutter 1 is opened and the second shutter 2 is closed as shown in FIG. 6(a) so that the sheet-shaped outer skin material F is placed on the shutter members 20, 20 . . . of the second shutter 2 in a state where the pushing member 30 is raised as shown in FIG. 6(b). Although not illustrated, the support member 60 is also disposed under the second shutter 2 in an initial set interval. When the outer skin material F is placed on the shutter members 20, 20 . . . the optical sensor 72 shown in FIG. 5 detects it, and the detected signal from the detector 71 is inputted to the setting unit 70. Drive control signals are inputted sequentially from the setting unit 70 to the respective motor controllers 15, 25, and 65 in response to the detected signal. According to this embodiment, although the outer skin material F is placed in the initial state where the second shutter 2 is completely closed so as to stably place the outer skin material F on the shutter members 20, 20 . . . , it is preferable that the outer skin material F is placed on the second shutter 2 in a state where the second shutter 2 is opened to the extent that the outer skin material F does not drop from the second shutter 2. Further, if the shutter members 10, 10 . . . are operated in a direction to be closed to reduce an opening area after the outer skin material F is placed on the shutter members 20, 20 . . . , the outer skin material F can be set on the shutter members 20, 20 . . . conforming to the reduced opening area of the shutter members 10, 10 . . . , so that the outer skin material F can be adjusted in its position so as to be accommodated in the shutter members 20, 20 . . . at a given position.

Next as shown in FIG. 7(a), the second shutter 2 is opened by the previously set amount corresponding to the size of the outer skin material F and the amount of the inner material, and the support member 60 is raised so that an interval between itself and the second shutter 2 is adjusted to the previously set interval. Then, as shown in FIG. 7(b), when the pushing member 30 is lowered, the press member 50 mounted on the pushing member 30 is brought into contact with the peripheral portion of the outer skin material F. Subsequently, when the pushing member 30 is further lowered, the interval between the press member 50 and the stay 52 fixed to the pushing member 30 is decreased because the press member 50 is fixed to the support rods 51, 51 . . . .Since the interval between press member 50 and stay 52 is decreased, the press member 50 is pressed toward the peripheral portion of the outer skin material F by the urging force of the coil spring 53 so that the outer skin material F is held on the shutter members 20, 20 . . . of the second shutter 2. In a state where the peripheral portion of the outer skin material F is held by the press member 50, if the pushing member 30 further advances into the opening of the second shutter 2 to recess the central portion of the outer skin material F, the outer skin material F is formed in the bowl shape. At this time, the outer skin material F is recessed to reach a position where it is supported by the support member 60 so that the outer skin material F is formed in a given bowl shape.

Next, as shown in FIG. 9(b), when the valve 40 inside the pushing member 30 is raised to open the discharge port of the pushing member 30 while raising the pushing member 30, the inner material G is discharged and is disposed on the bottom of the outer skin material F which is formed in the bowl shape. At the time when a given amount of inner material G is discharged, the valve 40 is lowered to close the discharge port. The inner material G expands to an area substantially corresponding to the opening of the second shutter 2. According to this embodiment, the outer skin material F can be formed in the bowl shape corresponding to the amount of inner material G while the width of the outer skin material F at the peripheral portion needed for sealing is secured by the holding means by adjusting the position between the opening of the second shutter 2 and the support member 60. Since the inner material G is supplied through the pushing member 30 while raising the pushing member 30, the outer skin material F made of dough can be prevented from being shrunk as the pushing member 30 is raised, and also the outer skin material F can be formed in the bowl shape, and still also the inner material G can be efficiently supplied. Then, the pushing member 30 is raised so as to move the press member 50 away from the peripheral portion of the outer skin material F as shown in FIG. 10(b).

Figure 11A:
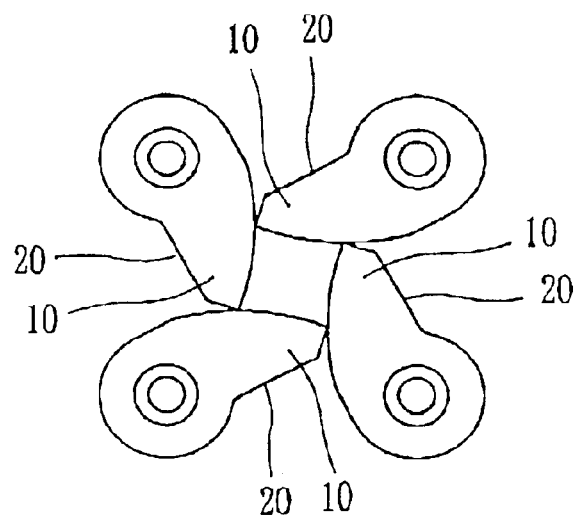
FIG. 11(a) and FIG. 11(b) are a plan view and a schematic side view, respectively, of shutters explaining food forming process by use of the food forming apparatus embodied in the present invention.
Figure 11B:
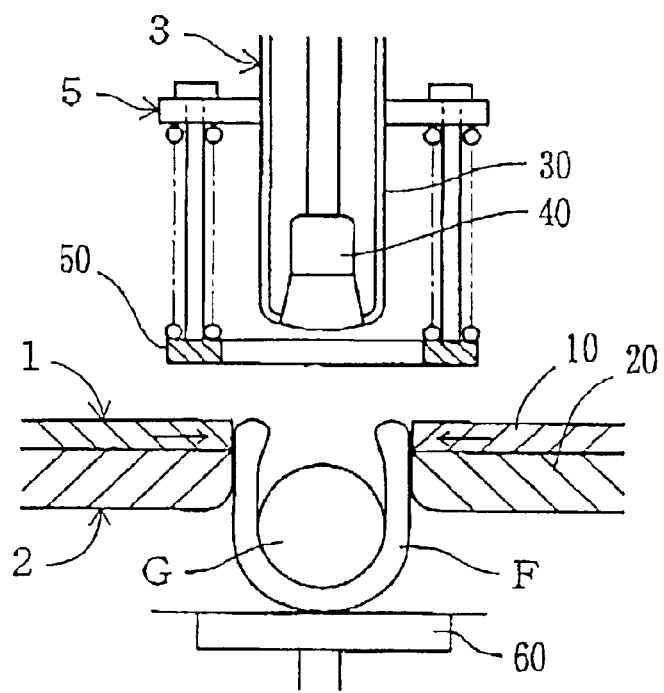
Figure 12A:
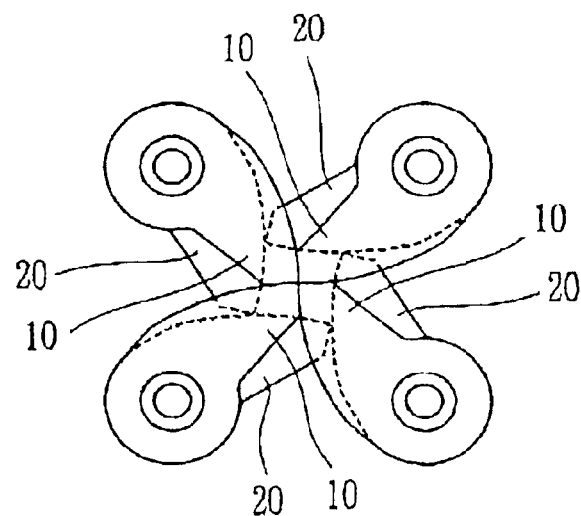
FIG. 12(a) and FIG. 12(b) are a plan view and a schematic side view, respectively, of shutters explaining food forming process by use of the food forming apparatus embodied in the present invention.

Then, the first shutter 1 is operated in the direction to be closed at the previously set operation start timing as shown in FIG. 11(a) so that the peripheral portion of the outer skin material F is collected (see FIG. 11(b)). Then, as shown in FIG. 12, the second shutter 2 is operated in the direction to be closed at the previously set operation start timing after the operation of the first shutter 1 is started, so as to further collect the peripheral portion of the outer skin material F which was collected by the first shutter 1. At this time, since the peripheral portion of the outer skin material F can be collected at the center thereof along the inner material G, the inner material G can be wrapped with the outer skin material F while air between the outer skin material F and the inner material G is escaped.

Figure 13A:
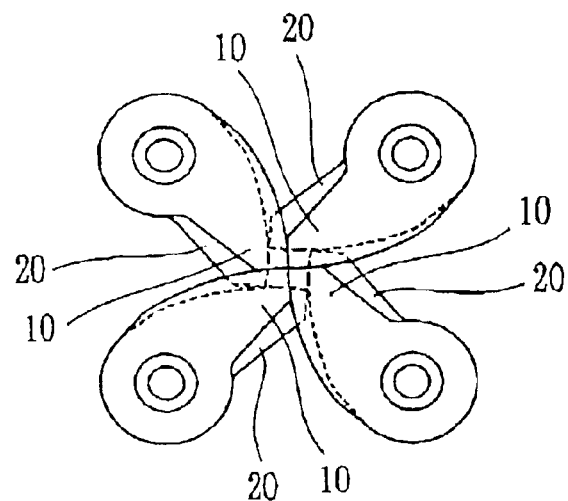
FIG. 13(a) and FIG. 13(b) are a plan view and a schematic side view, respectively, of shutters explaining food forming process by use of the food forming apparatus embodied in the present invention.
Figure 13B:
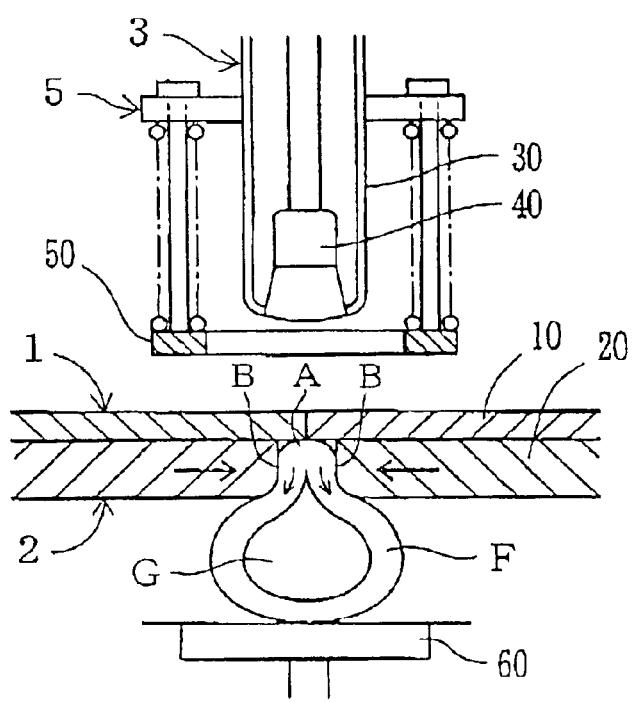
Figure 14A:
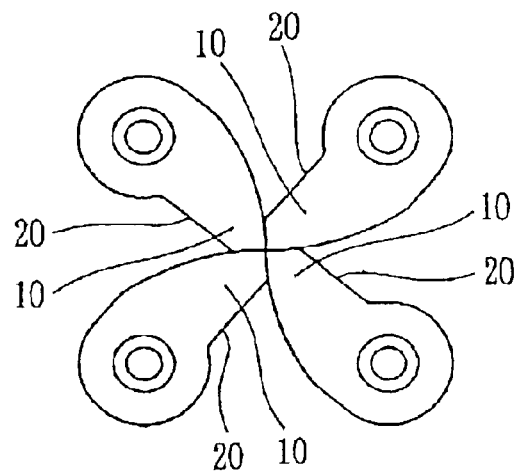
FIG. 14(a) and FIG. 14(b) are a plan view and a schematic side view, respectively, of shutters explaining food forming process by use of the food forming apparatus embodied in the present invention.
Figure 14B:
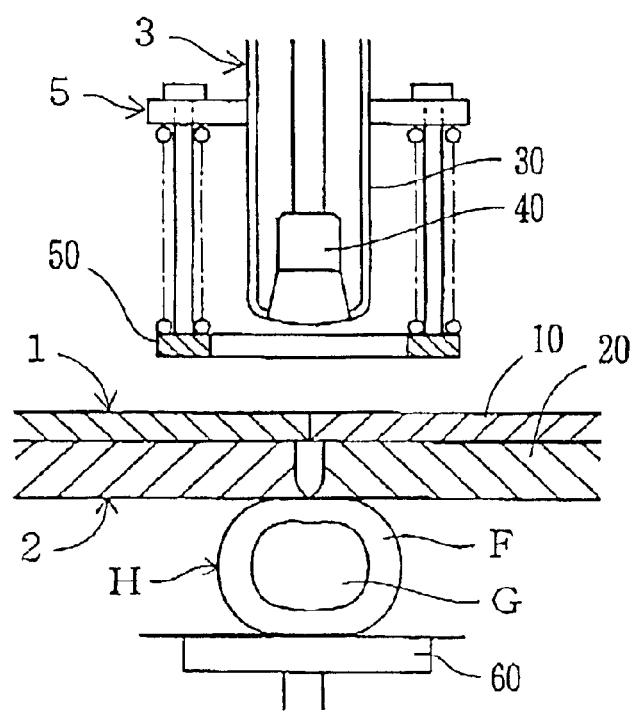

As shown in FIG. 13(a) and FIG. 14(a), when the second shutter 2 is operated in the direction to be closed further, the peripheral portion of the collected outer skin material F can be surely sealed, so that the inner material G is wrapped with the outer skin material F, thereby obtaining a final product H (see FIG. 13(b) and FIG. 14(b)). Since the first shutter 1 is completely closed at this time, the outer skin material F does not extrude from the second shutter 2 when the outer skin material F is sealed by the second shutter 2. Thereafter, the support member 60 which supports the final product H is lowered and the final product H is placed on the belt, and finally it is conveyed by the belt conveyor 63 when the belt conveyor 63 is driven.

Figure 12B:
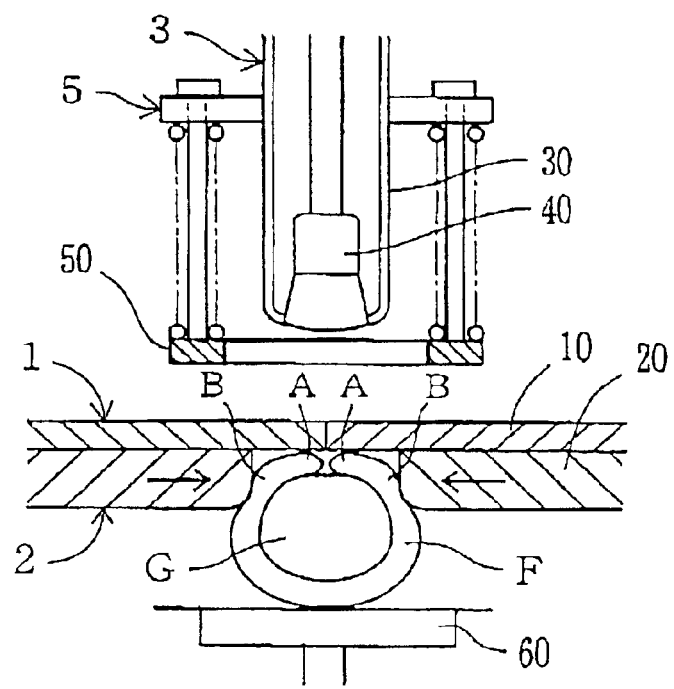

According to this embodiment of the invention, the first shutter 1 first collects the peripheral portion of the outer skin material F (see letters A, A shown FIG. 12(b)), then the second shutter 2 further collects and seals the peripheral portion of the outer skin material F (see letters B, B shown in FIG. 12(b)) which is different from the peripheral portion collected by the first shutter 1. As a result, even if the outer skin material F is dispersed in shape, the peripheral portion of the outer skin material F is first collected by the first shutter 1, then it is sealed by the second shutter 2 so that the peripheral portion of the outer skin material F can be sealed surely by stretching the outer skin material F by both shutters to some extent.

Figure 15:
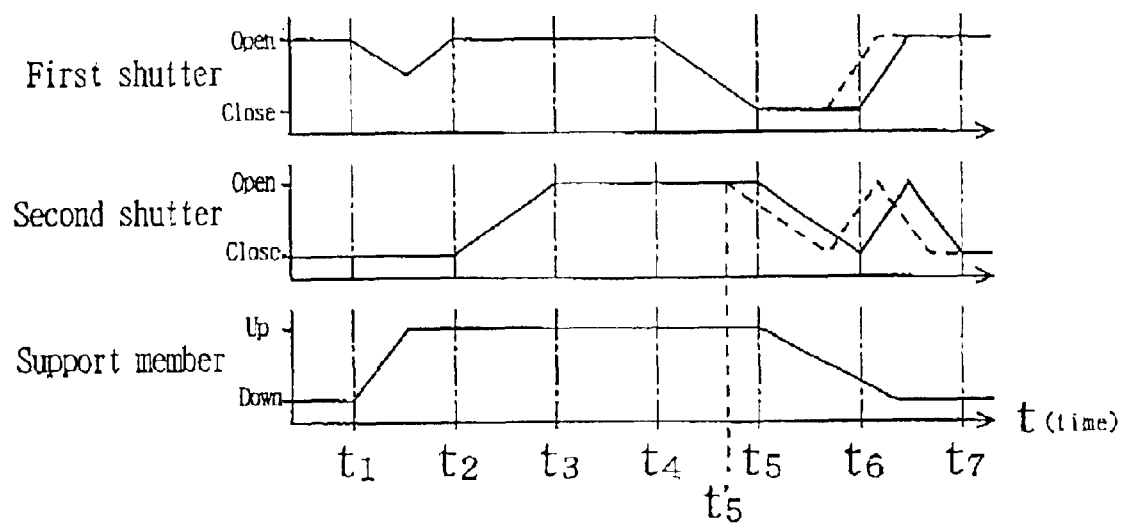
FIG. 15 is a diagram showing movement of the first shutter, the second shutter and a support member with elapse of time.
Figure 16A:
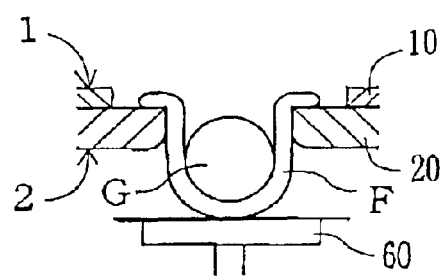
FIGS. 16(a), (b), (c) and (d) are schematic side views explaining another food forming process by use of the food forming apparatus embodied in the present invention.
Figure 16B:
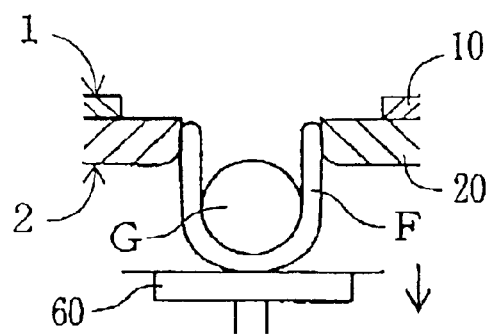
Figure 16C:
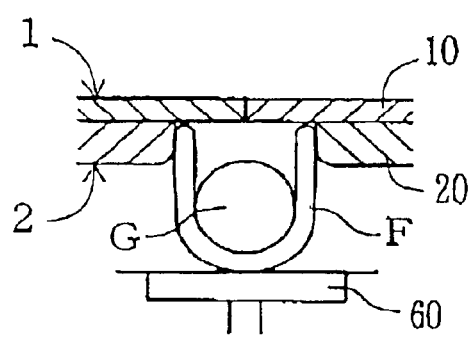
Figure 16D:
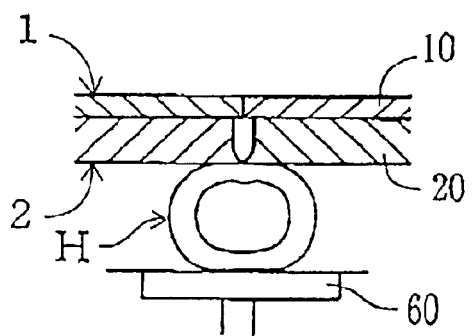

FIG. 15 shows the operation of the shutters with time, wherein the open/close operation of the first and second shutters and the vertical movement of the support member 60 are represented by a vertical axis as shown in FIG. 6 to FIG. 14, while time is represented by a horizontal axis. In an initial state as shown in the left side of time $t_1$, the support member 60 is located at the lower position in a state where the first shutter 1 is opened and the second shutter 2 is closed. When the outer skin material F is first detected at time $t_1$, the first shutter 1 is operated in the direction to be closed and is further closed to the middle position thereof so as to adjust the position of the outer skin material F, then it is returned to an original open state. The support member 60 is moved upward, thereby adjusting an interval between itself and the second shutter 2 to a given interval. At this time, the second shutter 2 is kept in a completely close state. In time $t_2$, the second shutter 2 is operated in the direction to be opened at the timing where the first shutter 1 is returned to the original open state, then it is stopped when it reaches a given opening area, then the outer skin material F is pushed into the opening area of the second shutter 2 by the pushing means 3 during the period from time $t_3$ to time $t_4$, and the inner material G is supplied into the outer skin material F. The close operation of the first shutter 1 is started at time $t_4$, and the peripheral portion of the outer skin material F is collected by the first shutter 1, and the first shutter 1 is rendered in a completely close state at time $t_5$, then the second shutter 2 starts the operation in the direction to be closed at time $t_5$ so as to seal the peripheral portion of the outer skin material F, and it is rendered in a completely close state at time $t_6$. Since the second shutter 2 is closed after the first shutter 1 was closed at this time, the outer skin material F is prevented from extruding from the upper surface of the second shutter 2 which occurs when the outer skin material F is sealed by the second shutter 2. The support member 60 is moved downward corresponding to the operation of the second shutter 2 at time $t_5$, thereby assisting the sealing operation of the second shutter 2. That is, the second shutter 2 is adjusted not to collect the peripheral portion of the outer skin material F more than necessity. Both the first and second shutters 1 and 2 are operated once in an open state from time $t_6$, then the second shutter 2 is returned to a close state, and thereafter returned to the original state at time $t_7$.

Described above is a series of operations for wrapping the inner material G with the outer skin material F to form the final product H. When adjusting the operation timings of the first and second shutters 1 and 2 and the position of the support member 60 are adjusted, it can cope with various cases. For example, although the peripheral portion of the outer skin material F is needed to be much collected when the size of the outer skin material F is smaller than a given size, the peripheral portion of the outer skin material F can be much collected by rendering the operation start timing of the second shutter 2 earlier than time $t_5$, namely, at time $t_5'$, as shown by dotted line in FIG. 15. This is caused by the fact that when the second shutter 2 is operated during the operation of the first shutter 1, the second shutter 2 further collects and seals the peripheral portion of the outer skin material F during the period when the outer skin material F which is collected by the first shutter 1 is not returned to the immediate earlier state, thereby enabling the reliable sealing.

That is, the earlier the operation start timing of the second shutter 2 is, more the peripheral portion of the outer skin material F is collected. On the contrary, if the peripheral portion of the outer skin material F is excessively collected, the downward movement start timing of the support member 60 at time $t_5$ is rendered earlier, so that the outer skin material F is moved downward at the time of the sealing operation of the second shutter 2, thereby adjusting amount of collection of the peripheral portion of the outer skin material F. Accordingly, if the outer skin material F is rich in stretching property, the second shutter 2 alone can effect the sealing operation as shown in FIG. 16. That is, in FIG. 10, the support member 60 is moved downward after the inner material G is supplied through the pushing member 30 (FIG. 16(*a*)) so as to adjust the peripheral portion of the outer skin material F to be positioned under the upper surface of the second shutter 2 (FIG. 16(*b*)), then the second shutter 2 is operated to seal the peripheral portion of the outer skin material F (FIG. 16(*d*)) after the first shutter 1 is closed (FIG. 16(*c*)). In this case, since the second shutter 2 is closed in a state where the first shutter is closed, the first shutter prevents the curst material F from extruding from the second shutter 2.

Figure 10:
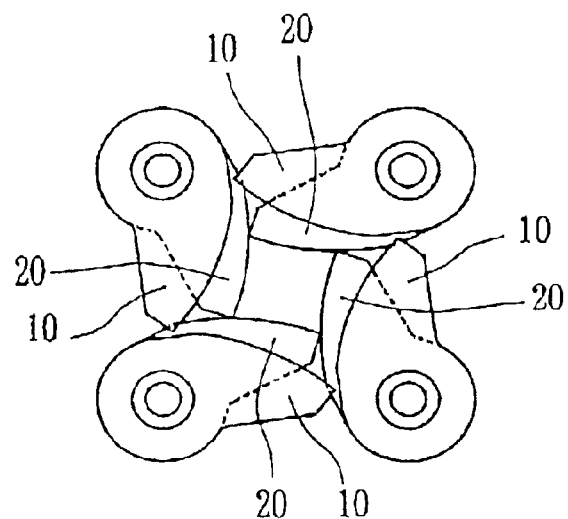
FIG. 10(a) and FIG. 10(b) are a plan view and a schematic side view, respectively, of shutters explaining food forming process by use of the food forming apparatus embodied in the present invention.
Figure 10:
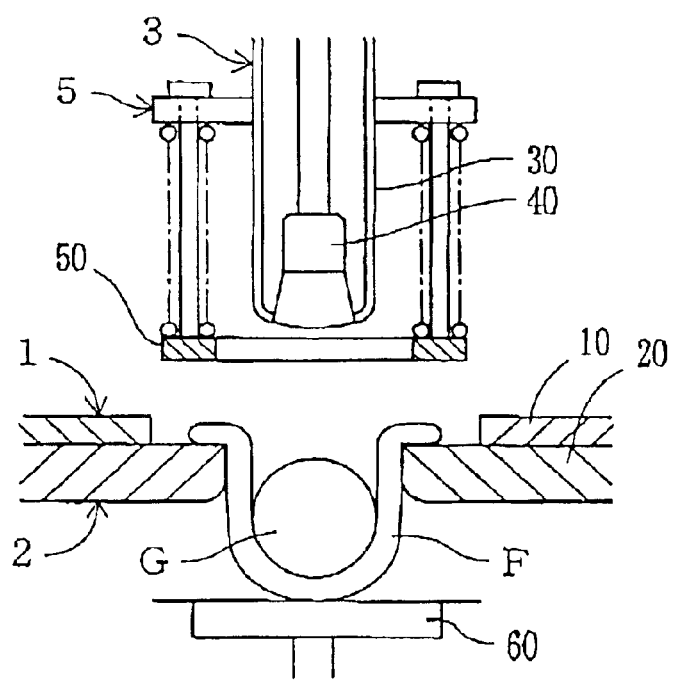
Figure 17:
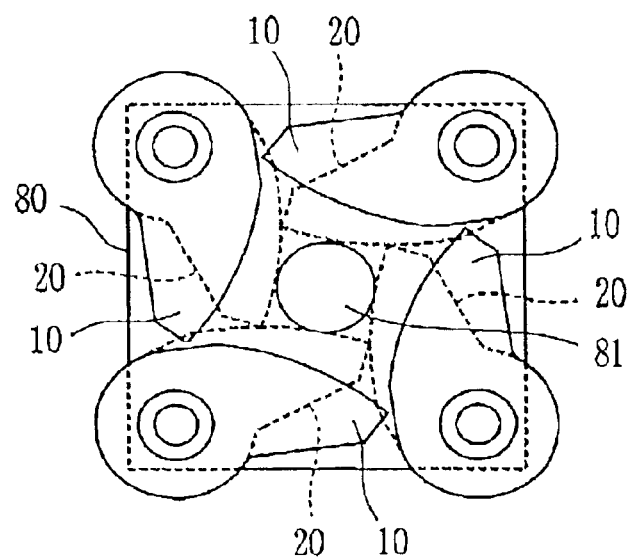
FIG. 17(a) and FIG. 17(b) are a plan view and a schematic side view, respectively, of shutters of the food forming apparatus provided with a receiving member.
Figure 17:
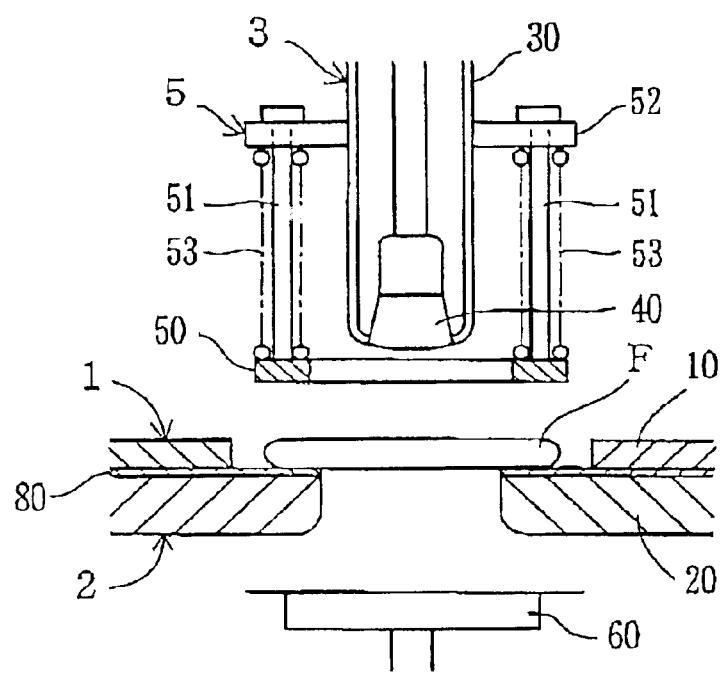
Figure 18A:
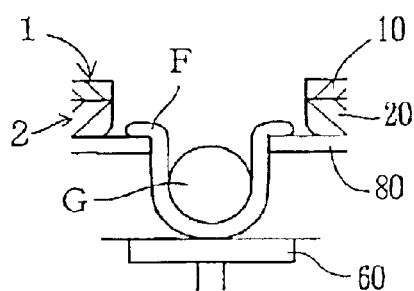
FIGS. 18(a), (b), (c) and (d) are schematic side views explaining a food forming process by use of the food forming apparatus provided with the receiving member.
Figure 18B:
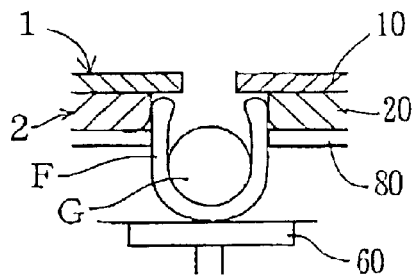
Figure 18C:
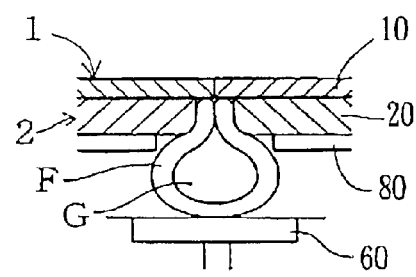
Figure 18D:
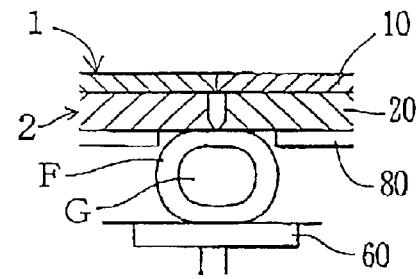

Further, as shown in FIG. 17, since a thin plate 80 serving as a receiving member for receiving the outer skin material F is sandwiched between the first and second shutters 1 and 2, the outer skin material F can be surely held by the press member 50 and thin plate 80. An opening 81 is provided on the thin plate 80 as shown by the plan view in FIG. 17(*a*). If the pushing member 30 advances into the opening 81, the outer skin material F can be formed in a bowl shape in the manner as the previous embodiment. If plural thin plates 80 having openings 81 different in size are provided, they can simply cope with the final product H having various sizes by merely changing the thin plate 80 in correspondance with the sizes of the final product H. When the operation timings of the first and second shutters 1 and 2 and the position of the support member 60 are adjusted as mentioned above, the collection of the peripheral portion of the outer skin material F and sealing operation can be adjusted to become optimum. Further, in FIG. 17, although the receiving member 80 is sandwiched between the first and second shutters 1 and 2, it can be disposed adjacent to the lower surface of the second shutter 2 as shown in FIG. 18. As shown in FIG. 10, after the outer skin material F is disposed on the receiving member 80 and the inner material G is supplied through the pushing member 30 (FIG. 18(*a*)), the operation of the first shutter 1 is started, then the second shutter 2 is operated to collect the peripheral portion of the outer skin material F on the receiving member 80 (FIG. 18(*b*)). The peripheral portion of the outer skin material F is further collected and sealed by the second shutter 2 (FIG. 18(*c*), (*d*)) in a state where the first shutter 1 is closed. Even in the case shown in FIG. 18 where there is no room for the collection of the peripheral portion of the outer skin material F because the outer skin material F and inner material G are respectively small, the sealing operation can be surely effected. Even in the case of FIG. 18, if the interval between the second shutter 2 and support member 60 is rendered small by adjusting the position of the support member 60, the peripheral portion of the outer skin material F can be assured to a sufficient extent. Further, if the operation timing of the second shutter 2 is rendered earlier, the amount of collection of the peripheral portion of the outer skin material F can be increased.

Figure 19:
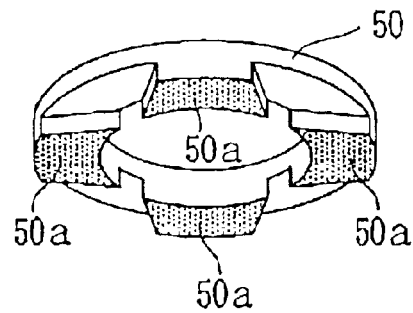
FIGS. 19(a), (b) and (c) are views explaining a case where an outer skin material is held partially.
Figure 19:
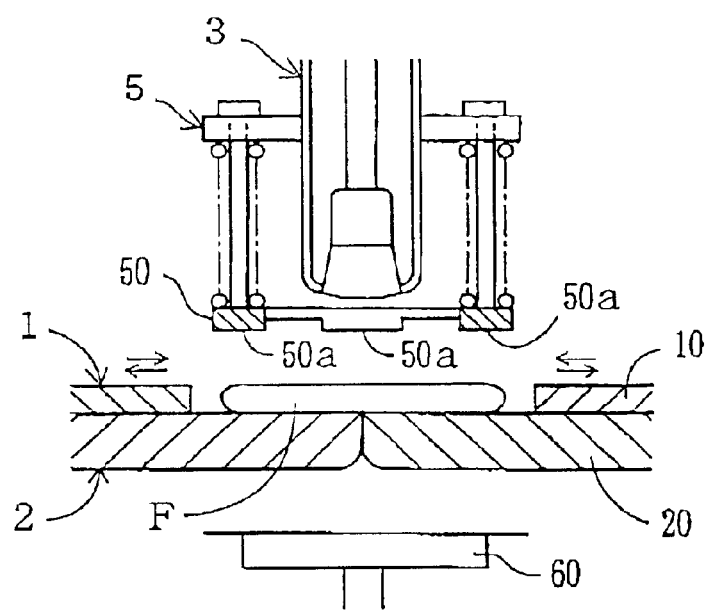
Figure 19:
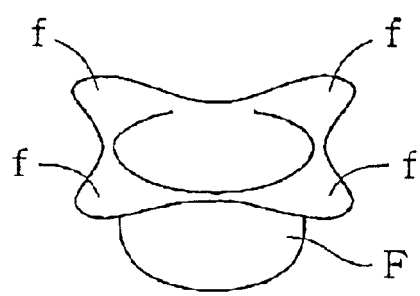

The holding means 5 partially hold the peripheral portion of the outer skin material F. In FIG. 19(*a*), presser protuberances 50*a*, 50*a* . . . serving as protuberances for partially holding the peripheral portion of the outer skin material F are formed on the ring-shaped press member 50 at equal intervals. As shown in FIG. 19(*b*), when the press member 50 is pressed against the peripheral portion of the outer skin material F in the manner that the presser protuberances 50*a*, 50*a* . . . are directed downward, the peripheral portion of the outer skin material F can be held partially by the press member 50. When the pushing means 3 is pushed toward the outer skin material F in a state where the periphery portion of the outer skin material F is held partially by the press member 50, the outer skin material F is stretched at the portion where it is held by the presser protuberances 50*a*, 50*a* . . . , thereby forming heels f. If the shutter starts sealing operation, the amount of peripheral portion of the collected outer skin material F is reduced, thereby reducing the thickness of the outer skin material F at the sealed portion. The presser protuberances 50*a*, 50*a* . . . have any shape if they can partially hold the peripheral portion of the outer skin material F, and they are not limited to the shape as shown in FIG. 19(*a*).

Figure 20:
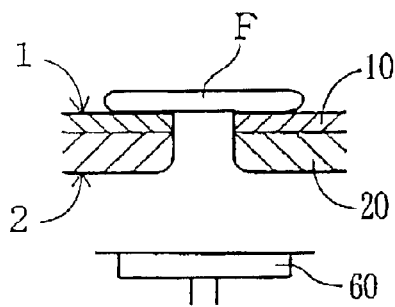
FIGS. 20(a), (b), (c), (d) and (e) are schematic side views explaining a food forming process by use of the food forming apparatus provided with no holding means.
Figure 20:
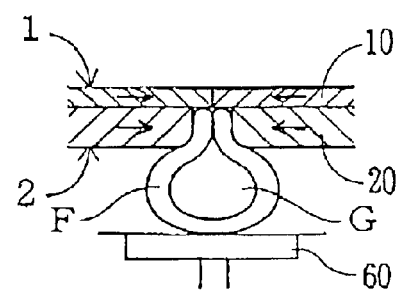
Figure 20:
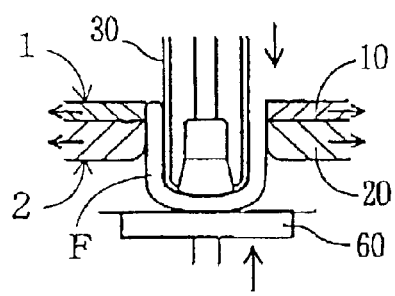
Figure 20:
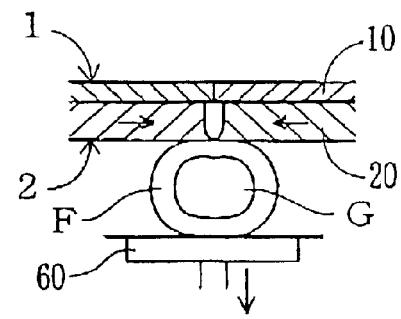
Figure 20:
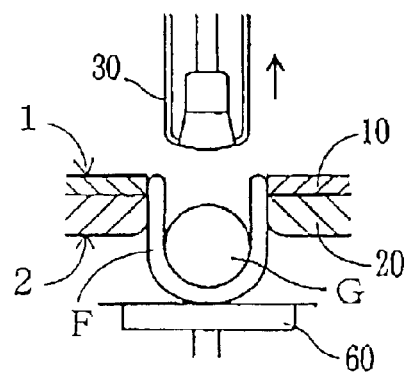
Figure 21A:
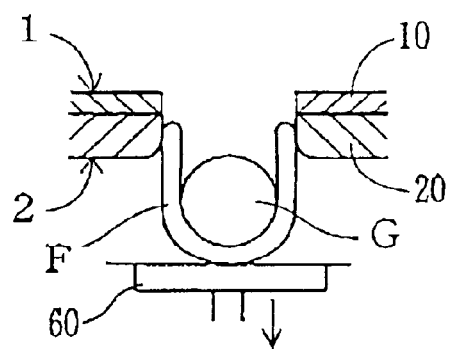
FIGS. 21(a), (b) and (c) are schematic side views explaining another food forming process by use of the food forming apparatus provided with no holding means.
Figure 21B:
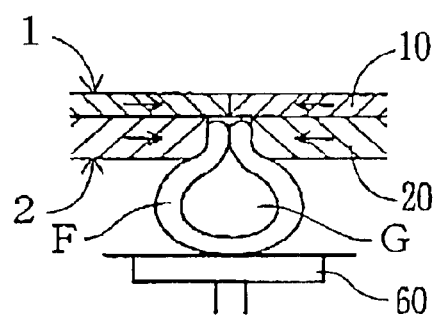
Figure 21C:
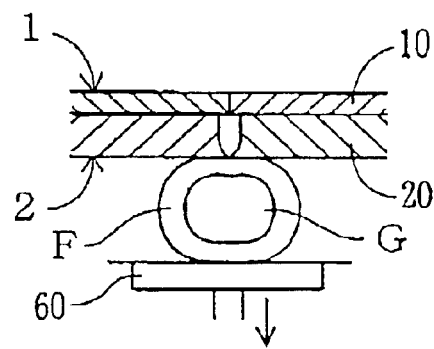

Another embodiment of a food forming apparatus having no holding means which is provided in the previous embodiment is described next. FIG. 20 shows a food forming process in the order of FIG. 20(*a*) to FIG. 20(*e*) in the same manner as the food forming process shown in FIG. 6 to FIG. 14. First of all, both a first shutter 1 and a second shutter 2 are set to a state where they are opened to such an extent that a sheet-shaped outer skin material F does not drop from the first and second shutters 1 and 2, and a support member 60 is set to a given position (FIG. 20(*a*)). The outer skin material F be disposed in a state where the first shutter 1 is closed. Then, both the first and second shutters 1 and 2 are opened to such an extent that a pushing member 30 can be inserted into the openings of the first and second shutters 1 and 2, and the support member 60 is moved upward, then the pushing member 30 is inserted into the openings of the first and second shutters 1 and 2 (FIG. 20(*b*)). When the pushing member 30 is inserted into the openings of the first and second shutters 1 and 2, the outer skin material F is formed in a bowl shape, then an inner material G is supplied through the pushing member 30, thereafter the pushing member 30 is moved away upward from the openings of the first and second shutters 1 and 2 (FIG. 20(*c*)). At this time, the peripheral portion of the outer skin material F is brought into contact with the openings of first and second shutters 1 and 2. Then, the first shutter 1 starts a close operation to collect the peripheral portion of the outer skin material F, then the second shutter 2 starts operation to further collect the peripheral portion of the outer skin material F and starts sealing operation (FIGS. 20(*d*), 20(*e*)). The amount of the collection of the outer skin material F can be adjusting by controlling operation start timings of the first and second shutters 1 and 2 in the same manner as the previous embodiment. Further, the amount of peripheral portion of the outer skin material F needed for sealing can be adjusted by adjusting the position of the support member 60. For example, FIG. 21 shows a case where a stretching property of the outer skin material F is excellent and the amount of peripheral portion of the outer skin material F needed for sealing is small. In FIG. 20(*c*), the support member 60 is moved downward to increase an interval between the support member 60 and second shutter 2, thereby rendering the peripheral portion of the outer skin material F to be brought into contact with only the opening of the second shutter 2 (FIG. 21(*a*)). If the first shutter 1 is closed in this state and then the second shutter 2 is closed (FIG. 21(*b*)), only the second shutter 2 collects the peripheral portion of the outer skin material F so that the amount of collection of the peripheral portion of the outer skin material F is reduced, while since the second shutter 2 is closed in a state where the first shutter 1 is closed, the outer skin material F can be prevented from being extruding from the second shutter 2 (FIG. 21(*c*)). In such a manner, according to this embodiment, when the operation start timings of the first and second shutters 1 and 2 and the position of the support member 60 are adjusted in the same manner as the previous embodiment, the operation of the second shutter for sealing the outer skin material F can be surely effected, and the holding means can be dispensed with so that the mechanism can be simplified and the time taken by the food forming process can be reduced.

Figure 22A:
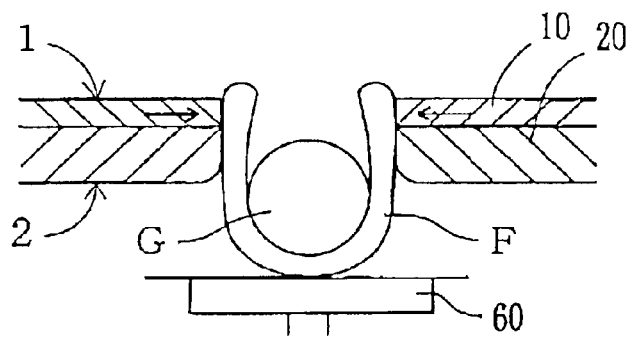
FIGS. 22(a), (b) and (c) are schematic views explaining a still another food forming process by use of the food forming apparatus embodied in the present invention.
Figure 22B:
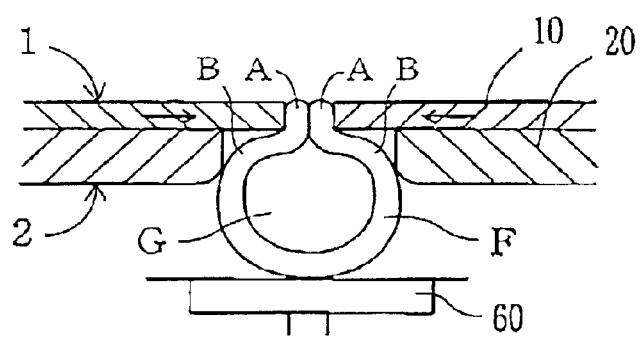
Figure 22C:
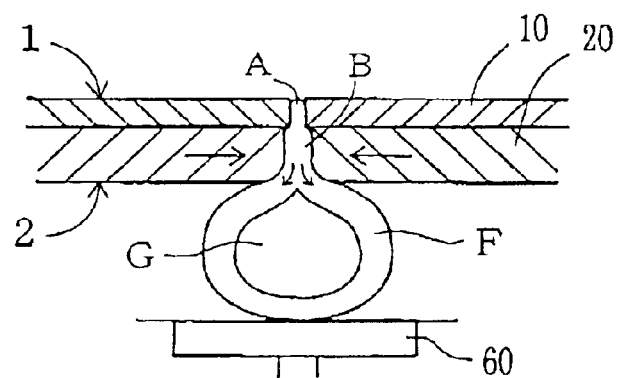

In the previous embodiment, although the first shutter 1 and the second shutter 2 are completely closed, they not be completely closed if they can seal the outer skin material F. As shown in FIGS. 22(*a*) to 22(*c*), if the first shutter 1 is operated in the direction to be closed in the same manner shown in FIG. 11 (FIG. 22(*a*)), and the peripheral portion of the outer skin material F is collected at an area where shutter members 10, 10 . . . of the first shutter 1 surround the peripheral portion of the outer skin material F (FIG. 22(*b*)). At this time, the first shutter 1 is not rendered in a completely close state, it collects the peripheral portion A of the outer skin material F at an area where the shutter members 10, 10 . . . surround the peripheral portion of the outer skin material F so as to cover the inner material G with the outer skin material F. That is, the first shutter 1 is rendered in a state where it picks up the peripheral portion of the outer skin material F so as to wrap the inner material G. Then in this state, the second shutter 2 is operated to be closed and effects the sealing operation (FIG. 22(*c*)). At this time, the second shutter 2 collects a peripheral portion B of the outer skin material F which is different from the peripheral portion A of the outer skin material F and seals the peripheral portion B of the outer skin material F, thereby surely sealing the outer skin material F. Further, the second shutter 2 is not completely closed and it stops its operation after sufficiently sealing the outer skin material F, so that the outer skin material F is not divided or cut, thereby reducing the damage to the outer skin material F.

Figure 23:
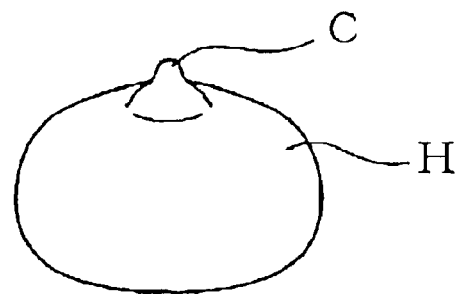
FIG. 23 is a perspective view of a final product formed by the food forming process in FIG. 22.

The final product H has a protrusion C on its upper surface as shown in FIG. 23. If the protrusion C is smashed by a roller and the like, not shown, and the final product H is turned upside down while it is conveyed by the belt conveyor, the smashed portion of the protrusion C is positioned on the bottom of the final product H, the upper surface of the final product H is finally finished to be a smooth surface of the outer skin material F.

Figure 24:
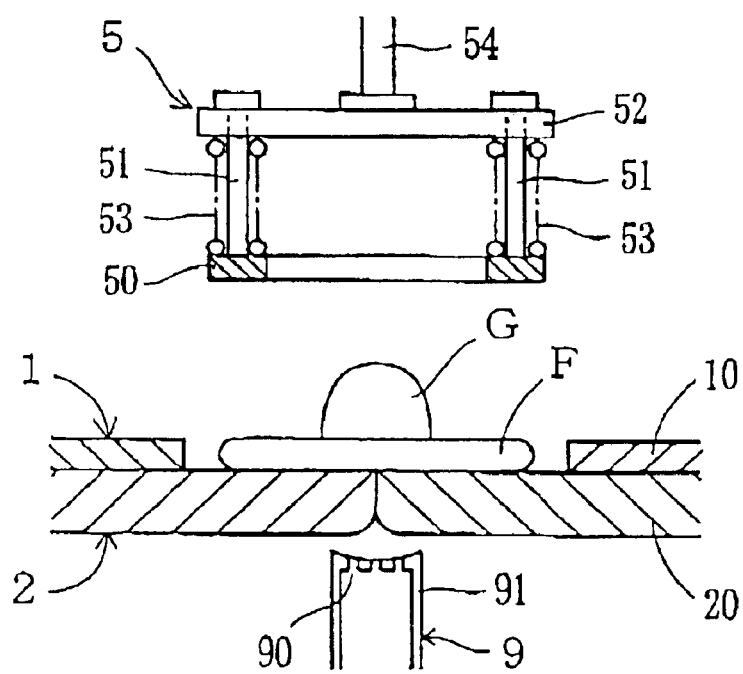
FIG. 24 is a schematic side view explaining food forming process by use of the food forming apparatus provided with suction means.
Figure 25:
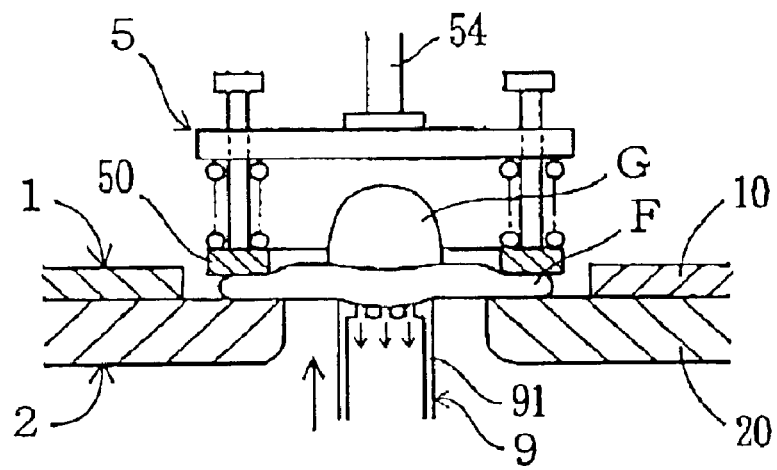
FIG. 25 is a schematic side view explaining food forming process by use of the food forming apparatus provided with suction means.
Figure 26:
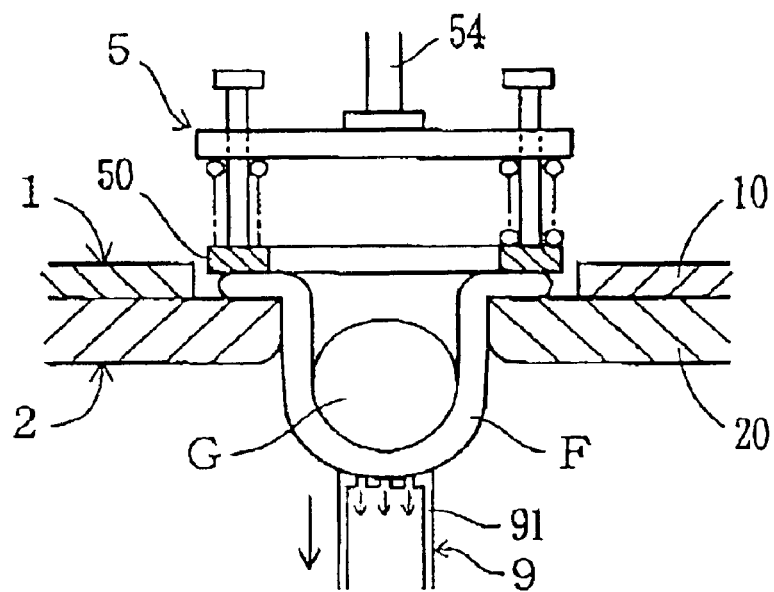
FIG. 26 is a schematic side view explaining food forming process by use of the food forming apparatus provided with suction means.
Figure 27:
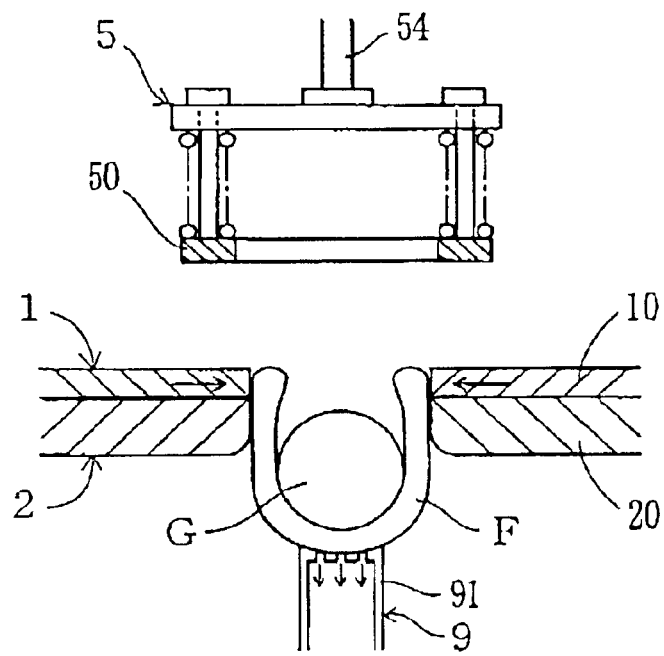
FIG. 27 is a schematic side view explaining food forming process by use of the food forming apparatus provided with suction means.
Figure 28:
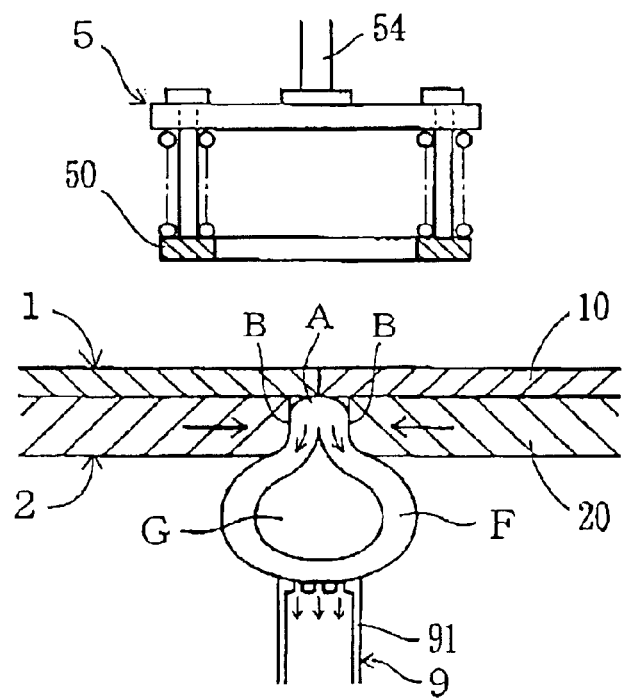
FIG. 28 is a schematic side view explaining food forming process by use of the food forming apparatus provided with suction means.
Figure 29:
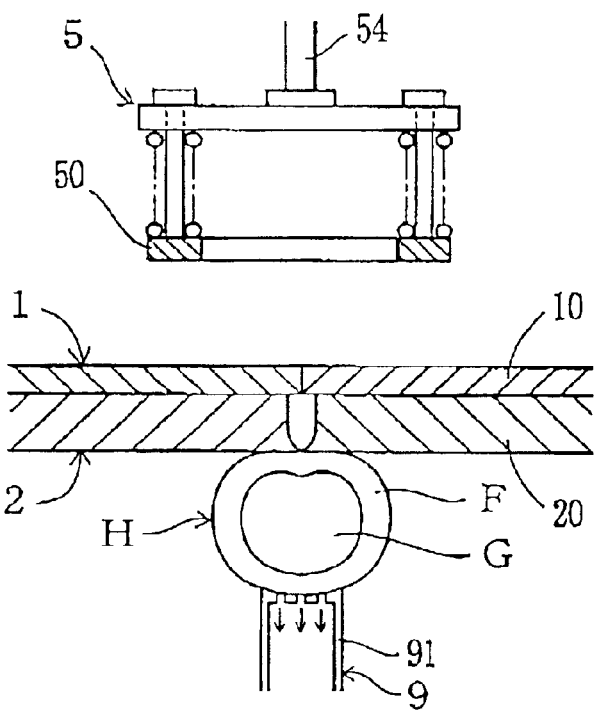
FIG. 29 is a schematic side view explaining food forming process by use of the food forming apparatus provided with suction means.

Although the outer skin material F is formed in the bowl shape by the pushing member 30 according to the previous embodiments, but it can be formed in the same bowl shape by providing suction means on the support member instead of the pushing member 30. In this case, the outer skin material F is drawn from the opening of the second shutter 2 by the suction means. FIG. 24 to FIG. 29 show a food forming process by use of a food forming apparatus provided with the suction means. As shown in FIG. 24, a stay 52 of holding means 5 is fixed to a cylinder 54, and the holding means 5 is moved up and down in response to the reciprocating motion movement of the cylinder 54. A support member 9 is formed of a tubular member 91 which has a plurality of ventholes 90 at the tip ends, and connected to an air intake and exhaust system, not shown. The support member 9 draws and holds the outer skin material F thereon when it inhales air through the ventholes 90, while it releases the outer skin material F which was drawn and held by the support member 9 when it exhausts air through the ventholes 90. In FIG. 24, a first shutter 1 is set to an open state while a second shutter 2 is set to a close state and the outer skin material F on which an inner material G is disposed is supplied to the upper surface of the second shutter 2. In FIG. 25, the holding means 5 which rendered the second shutter 2 open is lowered so as to press the peripheral portion of the outer skin material F onto the upper surface of the second shutter 2. The support member 9 is moved upward to contact the lower surface of the outer skin material F and draws and holds the outer skin material F thereon by inhaling air through the ventholes 90. In FIG. 26, when the support member 9 is lowered while it draws and holds the outer skin material F thereon, the outer skin material F is drawn from the opening of the second shutter 2 to be formed in a bowl shape. The downward moving distance of the support member 9 can be adjusted so as to optimize the necessary amount of the peripheral portion of the outer skin material F in the same manner as the previous embodiment. In FIG. 27, the holding means 5 is raised and moved away from the outer skin material F and the first shutter 1 starts the close operation to collect the peripheral portion of the outer skin material F. In FIG. 28, the first shutter 1 is rendered in a close state and the second shutter 2 starts the operation so that the second shutter 2 effects sealing operation while further collecting the peripheral portion of the outer skin material F. In FIG. 29, although the second shutter 2 completes the sealing operation in a close state, the outer skin material F is prevented from extruding from the second shutter 2 because the first shutter 1 is in a close state. The operation timings of the first and second shutters 1 and 2 are adjusted in the same manner as the previous embodiments such that the operation timing of the second shutter 2 is adjusted after the start of operation of the first shutter 1, thereby adjusting the amount of collection of the peripheral portion of the outer skin material F.

Although in the previous embodiment, the second shutter 2 is operated until it is finally closed so as to seal the peripheral portion of the outer skin material F, the second shutter 2 is not needed to be finally closed as shown in FIG. 22, if it seals the peripheral portion of the outer skin material F.

The food forming apparatus of the invention is not limited to the foregoing embodiments but can be modified variously.

Figure 30:
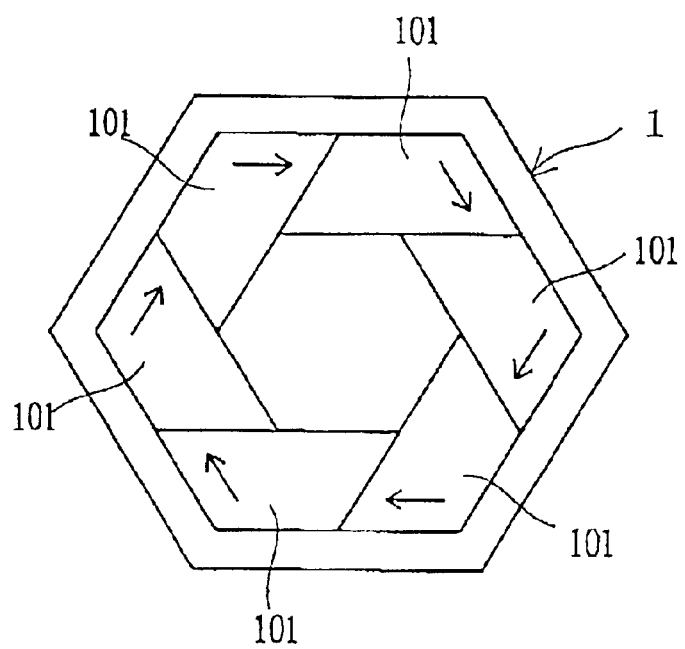
FIG. 30 is a schematic plan view showing a modified example of a shutter.
Figure 31A:
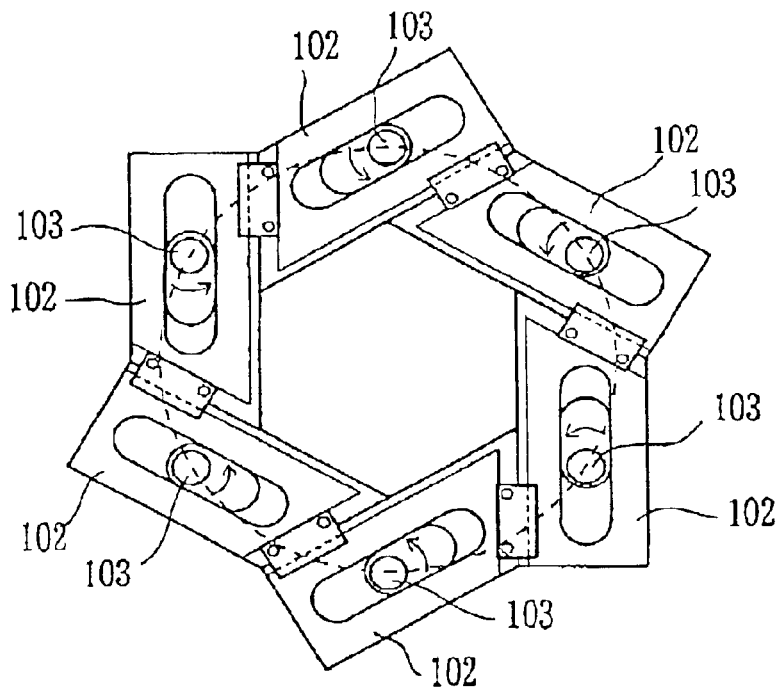
FIGS. 31(a) and (b) are schematic plan views showing another modified example of a shutter.
Figure 31B:
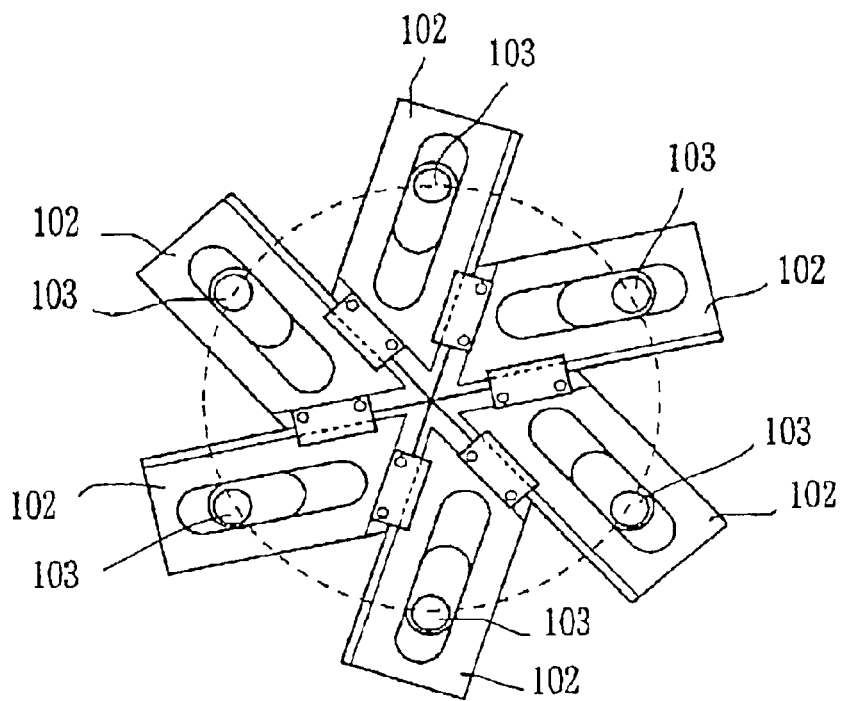
Figure 32:
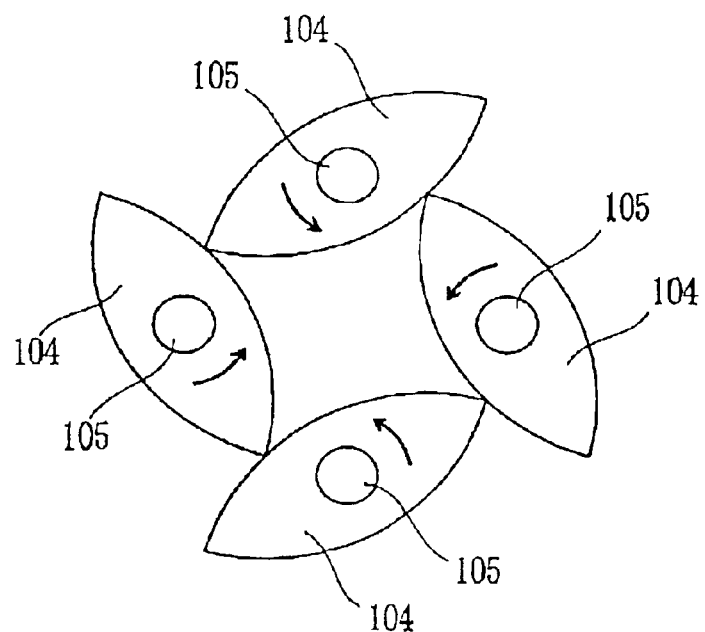
FIG. 32 is schematic plan views showing still further modified example of a shutter.
Figure 33:
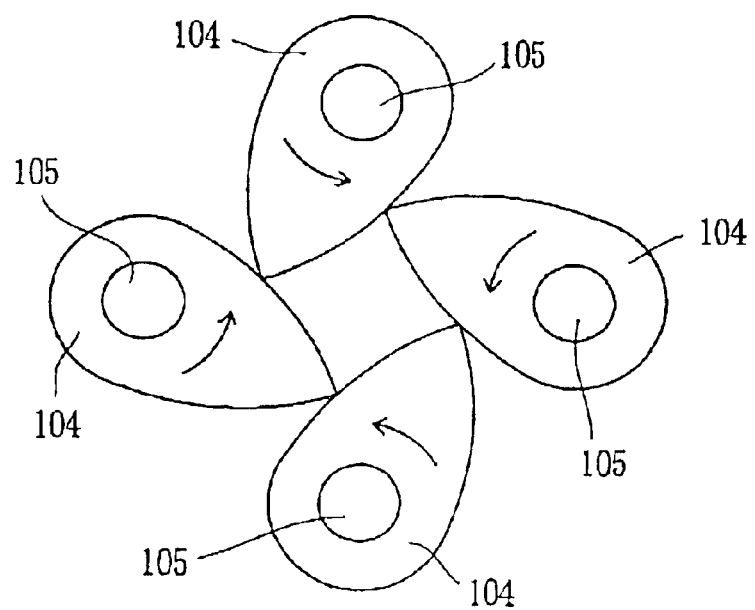
FIG. 33 is schematic plan views showing more still further modified example of a shutter.

For example, although four shutter members are employed as the first and second shutters 1 and 2 according to the foregoing embodiments, the number of shutter members is not specifically limited, and hence the number of shutter members of the first shutter be different from that of the second shutter. Although the driving mechanism for effecting an open/close operation of the shutters when the shutter members effect reciprocal swinging motion about a drive shaft is used for the shutter driving means, the shutter driving means of the invention is not limited to such a driving mechanism. It is possible to use various driving mechanisms for the shutter driving means, for example, as shown in FIG. 30 wherein shutter members 101, 101 . . . slide in the direction of arrows to effect linear motion, thereby effecting the open/close operation or as shown in FIGS. 31(a), 31(b) wherein shutter members 102, 102 . . . effect linear motion and swing in response to a rotary motion of operation pins 103 in the direction of arrows, thereby effecting the open/close operation. Further, modified examples shown in FIGS. 32 and 33 are cases where each rotary shaft 105 is continuously rotated in one direction to effect the open/close operation of the shutters, wherein in the case shown in FIG. 32, each shutter member 104 has sliding faces at both sides thereof relative to the adjacent shutter members and each shutter member 104 can effect two open/close operations when each rotary shaft 105 makes one revolution. In the case shown in FIG. 33, each shutter member 104 has a sliding face at one side thereof relative to the adjacent shutter members and each shutter member 104 can effect one open/close operation when each rotary shaft 105 makes one revolution. Further, the shutter mechanism of the first shutter 1 and that of the second shutter 2 may be different from each other. Further, it is possible to use various shapes of shutter members such as those having linear sides as shown FIG. 30 or FIG. 31 corresponding to the shutter driving means other than those set forth in the foregoing embodiment.

Although the first and second shutters 1 and 2 are disposed not to have a gap therebetween according to the foregoing embodiments, it is allowed to define a gap to some extent therebetween if the sealing operation of the shutters for sealing the outer skin material F is not troubled. Further, although the first and second shutters 1 and 2 are in a plane state in a close state thereof, the shutter members thereof have shapes having curved surface if they can collect the peripheral portion of the outer skin material and such states can be variously changed.

Although control data for driving the first shutter, the second shutter and the supporting means are inputted to the setting unit according to the foregoing embodiments, if the shape of the outer skin material which is conveyed toward the food forming apparatus is recognized by image taken by a video camera, and control data is generated by the recognized shape and setting data is automatically changed corresponding to the recognized shape, thereby automatically more finely adjusting the positions of outer skin material, the interval between the outer skin material and shutters and openings of the shutters so that the outer skin material can be more surely sealed.

Still further, according to the foregoing embodiments, although the belt of the belt conveyor 63 is moved up and down by the flat plate support member 60 serving as supporting means for supporting the outer skin material F and final product H, it is allowed that the belt conveyor 63 is moved up and down by itself.

Figure 34:
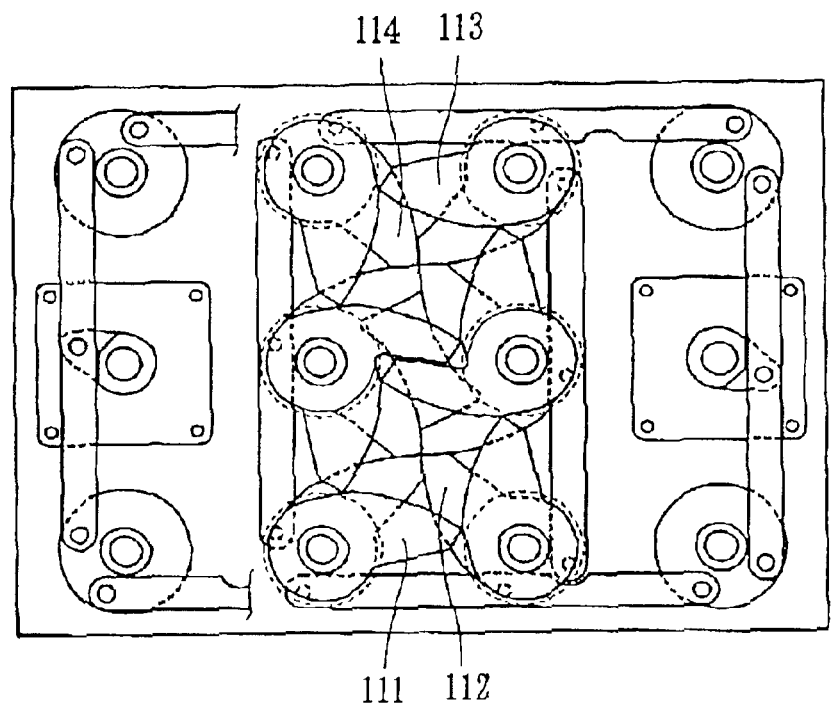
FIG. 34 is a schematic view showing a modified example provided with plural pairs of first and second shutters.
Figure 35:
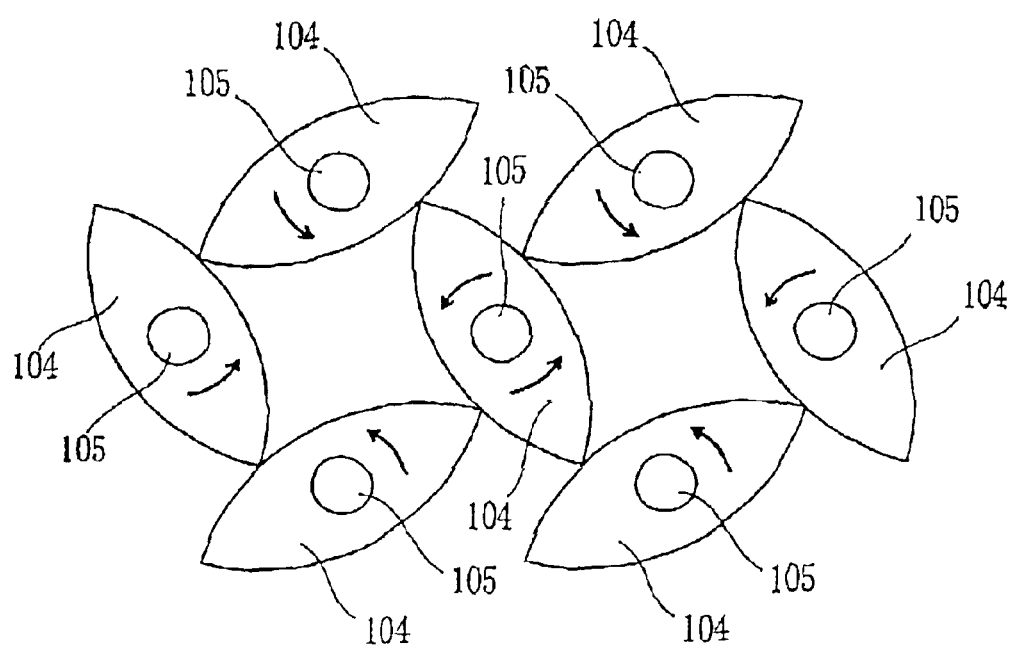
FIG. 35 is a schematic view showing a modified example provided with plural pairs of shutters.

According to the foregoing embodiments, there is only one pair of the first and the second shutters but plural pairs of the shutters can be provided as shown in FIGS. 34 and 35. In FIG. 34, the first and second shutters as shown in FIG. 2 to FIG. 4 are replaced by two pairs of shutters, a first shutter 111, a second shutter 112, a first shutter 113, a second shutter 114 which are disposed in parallel with each other. Drive shafts of the adjacent shutter members are shared and the adjacent shutter members are swung by one drive shaft. FIG. 35 is a case where the drive shafts of the shutter members are shared when the plural pairs of shutter mechanisms are employed in which each rotary shaft is continuously rotated as shown in FIG. 32. In this case, one shutter member is shared by the adjacent shutter mechanisms and the sliding faces formed on both sides of the shared shutter members are always used for the open/close operation. The outer skin material forming means such as the pushing means and the like, the holding means such as the pushing means and the like, the inner material supply means of the hopper and the like, the support means such as the support member are respectively provided corresponding to the number of pairs to be disposed. If the drive shafts of the plural pairs of adjacent shutter members are shared in such a manner, not less than three pairs can be disposed in parallel with one another in the same way, thereby effecting simultaneously multiple processing of the foods. Accordingly, the productivity is enhanced to a large extent, and the food forming apparatus can be simplified in structure and further rendered compact at the same time.

According to the prior art, it was necessary that the steps extending from the step of forming the outer skin material into a bowl shape by pushing it to the step of sealing the outer skin material while a cup is moved. However, according to the invention, a cup is not used, and hence the steps extending from the step of forming the outer skin material into a bowl shape by pushing it to the step of sealing the outer skin material can be effected at one spot. Further, the sealed final product can be conveyed from the support member as it is, thereby shortening the manufacturing time to a large extent and reducing a space where the food forming apparatus is installed to a large extent.

What is claimed is:

1. A food forming apparatus comprising:
   a first shutter comprised of a plurality of shutter members;
   a second shutter disposed under the first shutter and comprised of a plurality of shutter members; and
   shutter control means for operating the first and second shutters respectively so as to wrap an inner material with an outer skin material.

2. The food forming apparatus according to claim 1, wherein the shutter control means comprises first shutter control means for operating the first shutter in a state where the inner material is disposed on the outer skin material; and
   second shutter control means for controlling operation start timing of the second shutter and also operating the second shutter so as to seal peripheral portion of the outer skin material after an operation of the first shutter is started.

3. The food forming apparatus according to claim 1, further comprising support means disposed under the second shutter for supporting the outer skin material.

4. The food forming apparatus according to claim 3, wherein the support means comprises a support member disposed under the second shutter for supporting the outer skin material and support interval adjusting means for adjusting an interval between the second shutter and the support member.

5. The food forming apparatus according to claim 1, further comprising outer skin material forming means for forming the outer skin material into a bowl shape.

6. The food forming apparatus according to claim 5, wherein the crust material forming means is provided with pushing means for pushing the outer skin material into an opening area of the second shutter.

7. The food forming apparatus according to claim 6, wherein the pushing means is provided with inner material supply means for supplying the inner material.

8. The food forming apparatus according to claim 5, wherein the outer skin material forming means is provided with suction means for sucking the outer skin material through an opening area of the second shutter.

9. The food forming apparatus according to claim 1, further comprising a receiving member having an opening at the opening area of the second shutter.

10. The food forming apparatus according to claim 1, further comprising holding means for holding the peripheral portion of the outer skin material on the shutter members of the second shutter.

11. The food forming apparatus according to claim 9, further comprising holding means for holding the peripheral portion of the outer skin material on the receiving member.

12. The food forming apparatus according to claim 10, wherein the holding means is provided with protuberances for partially holding the peripheral portion of the outer skin material.

13. The food forming apparatus according to claim 1, further comprising plural pairs of the first shutter and the second shutter which are paired with each other.

* * * * *